(12) United States Patent
McGuire et al.

(10) Patent No.: US 9,746,070 B2
(45) Date of Patent: *Aug. 29, 2017

(54) ELECTRONIC CONTROL OF A TRANSMISSION

(71) Applicant: Polaris Industries Inc., Medina, MN (US)

(72) Inventors: Matthew P. McGuire, Forest Lake, MN (US); Cole A. Sytsma, Rochester, MN (US); Brian D. Krosschell, North Branch, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/947,737

(22) Filed: Nov. 20, 2015

(65) Prior Publication Data

US 2016/0146335 A1    May 26, 2016

Related U.S. Application Data

(63) Continuation-in-part of application No. 14/554,648, filed on Nov. 26, 2014.

(51) Int. Cl.
*G06F 7/00* (2006.01)
*G06F 17/00* (2006.01)
(Continued)

(52) U.S. Cl.
CPC ....... *F16H 61/0204* (2013.01); *F16H 59/105* (2013.01); *F16H 61/662* (2013.01); *F16H 59/36* (2013.01); *F16H 2059/366* (2013.01)

(58) Field of Classification Search
CPC ..... F16H 2059/6823; F16H 2059/0247; F16H 2061/0087; F16H 2061/66277;
(Continued)

(56) References Cited

U.S. PATENT DOCUMENTS 4,075,841 A    2/1978  Hamma et al.
4,892,014 A    1/1990  Morell et al.
(Continued)

FOREIGN PATENT DOCUMENTS

| DE | 19941009 A1 | 3/2001 |
| EP | 0 814 287 A2 | 12/1997 |
| EP | 2169278 A1 | 3/2010 |
| WO | WO 96/25612 A1 | 8/1996 |

OTHER PUBLICATIONS

International Search Report and Written Opinion issued by the European Patent Office, dated Mar. 18, 2016, for International Application No. PCT/US2015/061274; 9 pages.

(Continued)

*Primary Examiner* — Jelani Smith
*Assistant Examiner* — Luis A Martinez Borrero
(74) *Attorney, Agent, or Firm* — Faegre Baker Daniels LLP

(57) ABSTRACT

A recreational vehicle is provided including a power source, such as an engine or an electric motor, and a transmission having a variable gear ratio. A sub-transmission coupled to an output of the transmission includes a plurality of selectable gear configurations including park gear and at least one of a forward gear, a neutral gear and a reverse gear. An electronic controller is operative to electronically control the gear configuration of the sub-transmission in response to a set of conditions.

20 Claims, 11 Drawing Sheets

(51) Int. Cl.
  *G06F 19/00* (2011.01)
  *F16H 61/02* (2006.01)
  *F16H 59/10* (2006.01)
  *F16H 61/662* (2006.01)
  *F16H 59/36* (2006.01)

(58) Field of Classification Search
  CPC ..... F16H 2200/2035; F16H 2200/2038; F16H 2200/2046; F16H 2200/2007; F16H 2037/026; F16H 2059/366; F16H 2200/2005; B62M 2027/023; B62M 2027/021; B62M 2027/025; B62M 2027/026; B62M 2027/027; B60W 2540/16; B60W 2710/1005; B60W 2540/14; B60W 2710/022
  USPC ........ 701/1, 22, 52, 54, 58, 67, 51; 180/233, 180/183, 291, 292, 293
  See application file for complete search history.

(56) References Cited

U.S. PATENT DOCUMENTS

| | | | |
|---|---|---|---|
| 5,040,114 | A | 8/1991 | Ishikawa et al. |
| 5,218,540 | A | 6/1993 | Ishikawa et al. |
| 5,575,737 | A | 11/1996 | Weiss |
| 5,673,668 | A | 10/1997 | Pallett et al. |
| 5,919,112 | A | 7/1999 | Michael et al. |
| 6,139,468 | A * | 10/2000 | Goates ................. F16H 59/105 477/906 |
| 6,182,784 | B1 * | 2/2001 | Pestotnik ................. B60K 5/06 180/337 |
| 6,186,263 | B1 | 2/2001 | Takano |
| 6,456,918 | B2 * | 9/2002 | Nanri ..................... F16H 61/425 180/65.7 |
| 6,485,340 | B1 | 11/2002 | Kolb et al. |
| 6,581,710 | B2 | 6/2003 | Sprinkle et al. |
| 6,655,233 | B2 | 12/2003 | Evans et al. |
| 6,675,577 | B2 | 1/2004 | Evans |
| 6,851,495 | B2 | 2/2005 | Sprinkle et al. |
| 6,857,499 | B2 | 2/2005 | Kawamoto et al. |
| 7,044,260 | B2 | 5/2006 | Schaedler et al. |
| 7,150,341 | B2 | 12/2006 | Maeda et al. |
| 7,156,218 | B2 * | 1/2007 | Yamamoto .............. B60T 1/005 192/219.4 |
| 7,213,674 | B2 | 5/2007 | Maeda et al. |
| 7,281,375 | B1 | 10/2007 | Holder et al. |
| 7,533,755 | B2 | 5/2009 | Miyazaki et al. |
| 7,537,499 | B2 | 5/2009 | Davis et al. |
| 7,544,149 | B2 * | 6/2009 | Ayabe ................... B60W 10/06 477/107 |
| 7,637,343 | B2 * | 12/2009 | Nakagaki .............. B60K 17/22 180/233 |
| 7,651,438 | B2 | 1/2010 | Someya et al. |
| 7,665,566 | B2 * | 2/2010 | Okada ..................... B62D 5/04 180/291 |
| 7,793,751 | B2 | 9/2010 | Stevens |
| 8,050,827 | B2 * | 11/2011 | Hasegawa ............... F16H 3/006 701/51 |
| 8,061,465 | B2 | 11/2011 | Martino |
| 8,260,527 | B2 | 9/2012 | Arai |
| 8,281,892 | B2 | 10/2012 | Sugimoto et al. |
| 8,296,034 | B2 | 10/2012 | Tetsuka et al. |
| 8,370,032 | B2 | 2/2013 | Choby et al. |
| 8,381,846 | B2 * | 2/2013 | Davies ................... B60K 17/28 180/53.1 |
| 8,996,214 | B2 * | 3/2015 | Ishii ...................... B60K 6/485 104/119 |
| 9,057,436 | B1 | 6/2015 | Itoo et al. |
| 9,328,819 | B2 * | 5/2016 | Deurloo ................. F16H 61/16 |
| 2001/0005705 | A1 * | 6/2001 | Kon ..................... F16H 61/061 477/156 |
| 2001/0039800 | A1 | 11/2001 | Nanri et al. |
| 2002/0033059 | A1 | 3/2002 | Pels et al. |
| 2002/0072449 | A1 * | 6/2002 | Iwase ..................... F16H 61/16 477/97 |
| 2003/0119630 | A1 * | 6/2003 | Edelen ................ F16H 61/0213 477/115 |
| 2005/0279546 | A1 | 12/2005 | Tabata et al. |
| 2005/0288151 | A1 * | 12/2005 | Yamamoto ............ F02N 11/103 477/110 |
| 2006/0015234 | A1 | 1/2006 | Luh |
| 2006/0019790 | A1 * | 1/2006 | Morin ..................... B62K 5/01 475/142 |
| 2006/0081085 | A1 * | 4/2006 | Otsuka .................... F16H 59/10 74/473.21 |
| 2006/0208169 | A1 | 9/2006 | Breed et al. |
| 2006/0270520 | A1 | 11/2006 | Owens |
| 2007/0004552 | A1 | 1/2007 | Matsudaira et al. |
| 2007/0066444 | A1 * | 3/2007 | Matsudaira ......... F16H 61/0213 477/115 |
| 2008/0086240 | A1 | 4/2008 | Breed |
| 2008/0183358 | A1 | 7/2008 | Thomson et al. |
| 2008/0221760 | A1 * | 9/2008 | Wakamatsu ............ F16H 61/18 701/52 |
| 2009/0012682 | A1 * | 1/2009 | Mathis ................ F16H 61/0213 701/52 |
| 2009/0111649 | A1 * | 4/2009 | Hecht ................... F16H 63/483 477/92 |
| 2009/0111654 | A1 * | 4/2009 | Hecht ................... F16H 63/483 477/195 |
| 2009/0120710 | A1 * | 5/2009 | Hasegawa ............... F16H 3/006 180/365 |
| 2009/0152070 | A1 | 6/2009 | Nakamura et al. |
| 2009/0239705 | A1 | 9/2009 | Tawara et al. |
| 2009/0301830 | A1 | 12/2009 | Kinsman et al. |
| 2009/0302590 | A1 | 12/2009 | Van Bronkhorst et al. |
| 2010/0191429 | A1 | 7/2010 | Kuwahara et al. |
| 2011/0077810 | A1 | 3/2011 | Katou |
| 2011/0127095 | A1 | 6/2011 | Imamura et al. |
| 2011/0297462 | A1 | 12/2011 | Grajkowski et al. |
| 2012/0178561 | A1 | 7/2012 | Lafreniere et al. |
| 2012/0193163 | A1 | 8/2012 | Wimpfheimer et al. |
| 2012/0196713 | A1 | 8/2012 | He et al. |
| 2012/0217078 | A1 | 8/2012 | Kinsman et al. |
| 2013/0033070 | A1 | 2/2013 | Kinsman et al. |
| 2013/0066496 | A1 | 3/2013 | Ishii |
| 2013/0092468 | A1 | 4/2013 | Nelson et al. |
| 2013/0096790 | A1 | 4/2013 | Nelson |
| 2013/0096793 | A1 | 4/2013 | Krosschell |
| 2013/0175779 | A1 | 7/2013 | Kvien et al. |
| 2013/0245875 | A1 | 9/2013 | Imamura et al. |
| 2013/0319785 | A1 | 12/2013 | Spindler et al. |
| 2014/0060954 | A1 | 3/2014 | Smith et al. |
| 2014/0136060 | A1 * | 5/2014 | Deurloo ............... F16H 61/0204 701/51 |
| 2014/0256507 | A1 | 9/2014 | Sakamoto |
| 2014/0288763 | A1 * | 9/2014 | Bennett ................. B62D 11/18 701/31.6 |
| 2014/0290408 | A1 * | 10/2014 | Kudo ..................... F16H 55/14 74/411 |
| 2014/0338484 | A1 | 11/2014 | Maki et al. |
| 2014/0343807 | A1 | 11/2014 | Maki |
| 2015/0041237 | A1 | 2/2015 | Nadeau et al. |
| 2015/0057866 | A1 | 2/2015 | Tseng et al. |
| 2015/0094919 | A1 * | 4/2015 | Nozaki ............... F16H 61/0213 701/56 |
| 2016/0091057 | A1 | 3/2016 | Choi |
| 2016/0091077 | A1 | 3/2016 | Sotani et al. |
| 2016/0146334 | A1 * | 5/2016 | Nelson ................ F16H 61/0204 701/22 |
| 2016/0194854 | A1 | 7/2016 | Yamazaki et al. |
| 2016/0195186 | A1 | 7/2016 | Shamshiri et al. |

OTHER PUBLICATIONS

Second Written Opinion of the International Searching Authority issued by the European Patent Office, mailed Nov. 9, 2016, for International Application No. PCT/US2015/061274; 5 pages.

(56) References Cited

OTHER PUBLICATIONS

International Search Report and Written Opinion issued by the European Patent Office, dated Jun. 13, 2017, for International Application No. PCT/US2016/063030; 26 pages.

* cited by examiner

ELECTRONIC CONTROL OF A TRANSMISSION

PRIORITY

The present application is a Continuation-In-Part of U.S. application Ser. No. 14/554,648, filed Nov. 26, 2014, entitled ELECTRONIC SHIFTING OF A TRANSMISSION, the priority of which is hereby claimed and the disclosure of which is hereby incorporated by reference in its entirety for all that it teaches and for all purposes.

FIELD OF THE DISCLOSURE

The present disclosure relates to an electronically controlled transmission, and more particularly to systems and methods for electronically controlling a sub-transmission of a recreational vehicle.

BACKGROUND AND SUMMARY

Some recreational vehicles, such as all-terrain vehicles (ATV's), utility vehicles, motorcycles, snowmobiles, etc., include an electronically controlled transmission. In recreational vehicles with an electronically controlled transmission, a separate sub-transmission is typically coupled to an output of the electronically controlled transmission for shifting between park, neutral, reverse, low-forward and high-forward gear configurations. Sub-transmissions, also referred to as a range box, are mechanically linked to a shifter located in the operator area. The mechanical linkage may include cables and other linkages.

Due to the versatility of many recreational vehicles, various circumstances can arise that may not be present for non-recreational vehicles. For example, a user of a recreational vehicle may not shift the sub-transmission into park after keying off the vehicle. As another example, a user may try to shift the sub-transmission under improper vehicle conditions, which may result in damage to the powertrain of the vehicle. As even another example, a user may select different operating modes when using the vehicle for different purposes.

Accordingly, in an embodiment of the present disclosure, a recreational vehicle is provided including a chassis, a ground engaging member configured to support the chassis, and a power source supported by the chassis. The power source includes at least one of an engine and an electric motor. The vehicle further includes an ignition in communication with the power source and the ignition having an on-state and an off-state. The vehicle further includes a transmission driven by the power source. The vehicle further includes a sub-transmission coupled to the transmission. The sub-transmission having a plurality of selectable gear settings including a park gear setting and at least one of a forward gear setting, a reverse gear setting, and a neutral gear setting. The vehicle further includes an actuator operative to change the gear setting of the sub-transmission. The vehicle further includes a shifter including a signal output operative to provide a shift request signal indicative of a request to change the gear setting of the sub-transmission. The vehicle further includes at least one sensor configured to detect at least one first speed value selected from a group of a ground speed of the vehicle and a speed of a component of the vehicle. The vehicle further includes a controller including a processor. The controller is in communication with the actuator, the at least one sensor, and the shifter, wherein the controller controls the actuator to set the gear setting to the park gear setting in response to a first set of park condition signals, wherein the first set of park condition signals comprise: the ignition being in the off-state, the sub-transmission having a gear setting other than the park gear setting and the at least one sensor indicating that the first speed value is at or below a threshold.

In another illustrated embodiment of the present disclosure, a recreational vehicle is provided including a chassis, a ground engaging member configured to support the chassis, and a power source supported by the chassis. The power source includes at least one of an engine and an electric motor. The vehicle further includes an ignition in communication with the power source and the ignition having an on-state and an off-state. The vehicle further includes a transmission driven by the power source. The vehicle further includes a sub-transmission coupled to the transmission. The sub-transmission having a plurality of selectable gear settings including a park gear setting and at least one of a forward gear setting, a reverse gear setting, and a neutral gear setting. The vehicle further includes an actuator operative to change a gear configuration of the sub-transmission. The vehicle further includes a shifter including a signal output operative to provide a shift request signal indicative of a request to change the gear setting of the sub-transmission. The vehicle further includes at least one sensor configured to detect at least one first speed value selected from a group of a ground speed of the vehicle and a speed of a component of the vehicle. The vehicle further includes a controller including a processor. The controller being in communication with the actuator, the at least one sensor, and the shifter. The controller controls the actuator to set the gear setting of the sub-transmission to a requested gear setting in response to a shift request for the requested gear setting when a first set of shift conditions are satisfied and wherein the controller controls the actuator to cause the gear setting to remain in a current gear setting in response to a shift request for the target gear setting when the first set of shift conditions are not satisfied. The first set of shift conditions comprise: the first speed value detected by the at least one sensor being within a defined range. Furthermore, when the controller causes the gear setting to remain a current gear setting due to the first set of shift conditions not being satisfied, the vehicle continues to monitor the first speed value and upon the speed value satisfying the first set of shift conditions, the controller instructs setting the gear setting of the sub-transmission to the requested gear setting without requiring reception of an additional shift request signal for the requested gear setting.

In yet another illustrated embodiment of the present disclosure, a recreational vehicle is provided including a chassis, a ground engaging member configured to support the chassis and a power source supported by the chassis. The power source includes at least one of an engine and an electric motor. The vehicle further includes a transmission driven by the power source. The vehicle further includes a sub-transmission coupled to the transmission. The sub-transmission having a plurality of selectable gear configurations including at least one of a park gear setting, a forward gear setting, a reverse gear setting, and a neutral gear setting. The vehicle further includes a sub-transmission actuator operative to change a gear setting of the sub-transmission. The vehicle further includes a shifter including a signal output operative to provide a shift request signal indicative of a request to change the gear configuration of the sub-transmission. The vehicle further includes a user interface comprising a plurality of selectable operating modes, the plurality of selectable operating modes including a plow mode. The vehicle further includes a controller including a processor. The controller is in communication with the sub-transmission actuator and the interface, wherein the controller, when a first mode is selected via the interface, prevents the sub-transmission from being placed in a first gear setting when a shift request signal that requests the first gear setting is received.

Another embodiment provides a method of operating a recreational vehicle including: receiving an indication of a vehicle ignition being in one of an on-state and an off-state; receiving an indication of a sub-transmission setting selected from the group including a park gear setting and at least one of a forward gear setting, a reverse gear setting and a neutral gear setting; receiving an indication of at least one first speed value selected from a group of a ground speed of the vehicle and a speed of a component of the vehicle; and emitting a signal to place the sub-transmission in a park setting when a first set of park conditions is satisfied, the first set of park conditions including: the ignition being in the off state, the sub-transmission having a gear setting other than the park gear setting; and the first speed value being at or below a threshold.

Another embodiment provides a method of operating a recreational vehicle including: receiving an indication of a first speed value for the vehicle, the first speed value selected from a group of a ground speed of the vehicle and a speed of a component of the vehicle; receiving a shift request signal indicative of operation of a shifter requesting a change in gear setting of a sub-transmission; providing a control signal requesting setting the gear setting of the sub-transmission to a requested gear setting in response to a shift request for a requested gear setting when a first set of shift conditions are satisfied, and causing the gear setting to remain in a current gear setting in response to a shift request for the requested gear setting when the first set of shift conditions are not satisfied, the first set of shift conditions including: the first speed value being within a defined range, and when the controller causes the gear setting to remain a current gear due to the first set of shift conditions not being satisfied, continuing to monitor the first set of shift conditions and upon satisfying the first set of shift conditions, the controller instructs setting the gear setting of the sub-transmission to the requested gear setting without requiring reception of an additional shift request signal for the requested gear setting.

Another embodiment provides a method of operating a recreational vehicle including: receiving a signal requesting an operational mode for the vehicle; causing the vehicle to adopt the operational mode; receiving a request to place a sub-transmission of the vehicle in a first gear setting; and preventing a sub-transmission from being placed in the first gear setting based upon the requested first gear setting and the operational mode of the vehicle.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
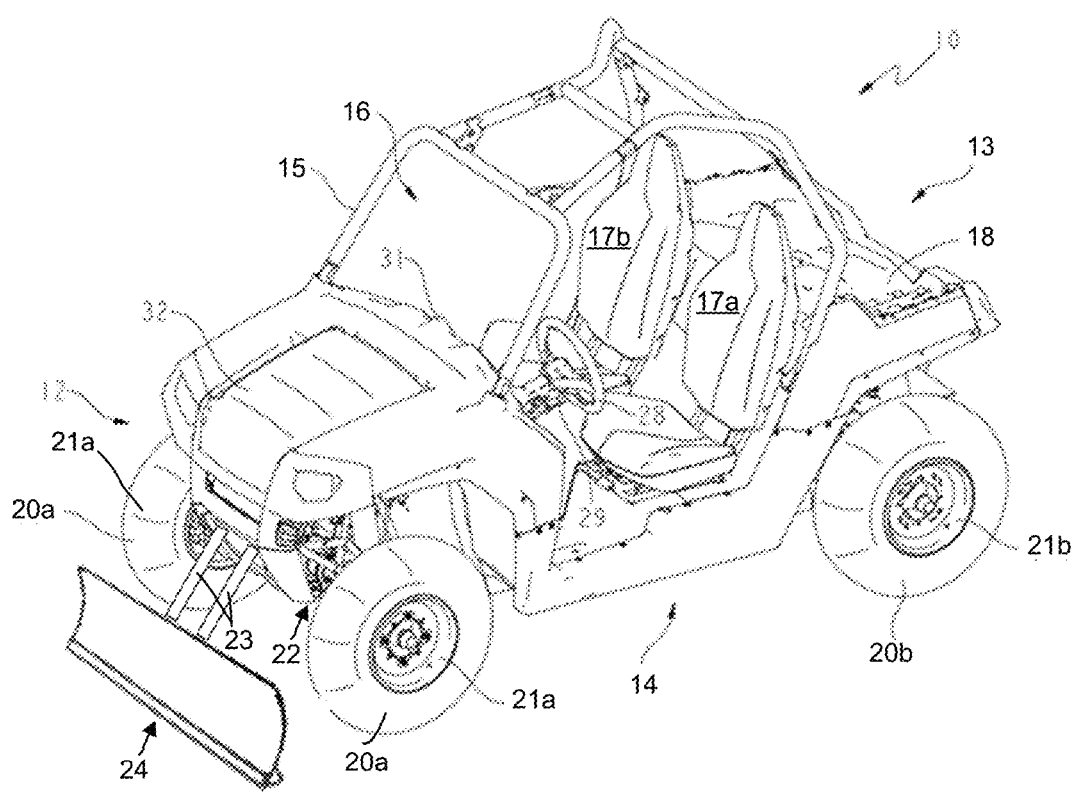
FIG. 1 is a perspective view of an exemplary vehicle incorporating the electronically controlled sub-transmission of the present disclosure.

Referring initially to FIG. 1, an exemplary vehicle 10 is illustrated that includes an electronically controlled sub-transmission as disclosed herein. Vehicle 10 is illustratively a side-by-side ATV 10 including a front end 12, a rear end 13, and a frame or chassis 14 that is supported above the ground surface by ground engaging members in the form of a pair of front wheels 21a including tires 20a and a pair of rear wheels 21b including tires 20b. Vehicle 10 includes a pair of laterally spaced-apart bucket seats 17a, 17b, although a bench style seat or any other style of seating structure may be used. Seats 17a, 17b are positioned within a cab 16 of vehicle 10. A protective roll cage 15 extends over cab 16 to reduce the likelihood of injury to passengers of vehicle 10 from passing branches or tree limbs and to serve as a support in the event of a vehicle rollover. Roll cage 15 includes a plurality of support bars and, in one embodiment, is comprised of a metal material. Cab 16 also includes front dashboard 31, adjustable steering wheel (steering input device) 28, and shift lever 29. Front dashboard 31 may include a tachometer, speedometer, a display (e.g., display 106 of FIG. 2), or any other suitable instrument.

Front dashboard 31 may also include an ignition (not shown) having an on-state and an off-state. In embodiments, the ignition receives an ignition key and the ignition key is turned to an "on" setting for turning on the vehicle 10; or, in embodiments, the ignition is a push-button start ignition system such that an ignition key (or token) only needs to be in the proximity of the ignition system, followed by activation of a push-button start in order to turn on the vehicle 10. In embodiments, when an ignition key for the vehicle 10 is either inserted into the ignition and turned to an "on" setting or the ignition key (or token) is in the proximity of the ignition system followed by activation of a push-button start, the ignition may be referred to herein as being in an "on-state." If the ignition is not turned to an on setting or has not been activated by a push-button, the ignition may be referred to herein as being in an "off-state."

Figure 2:
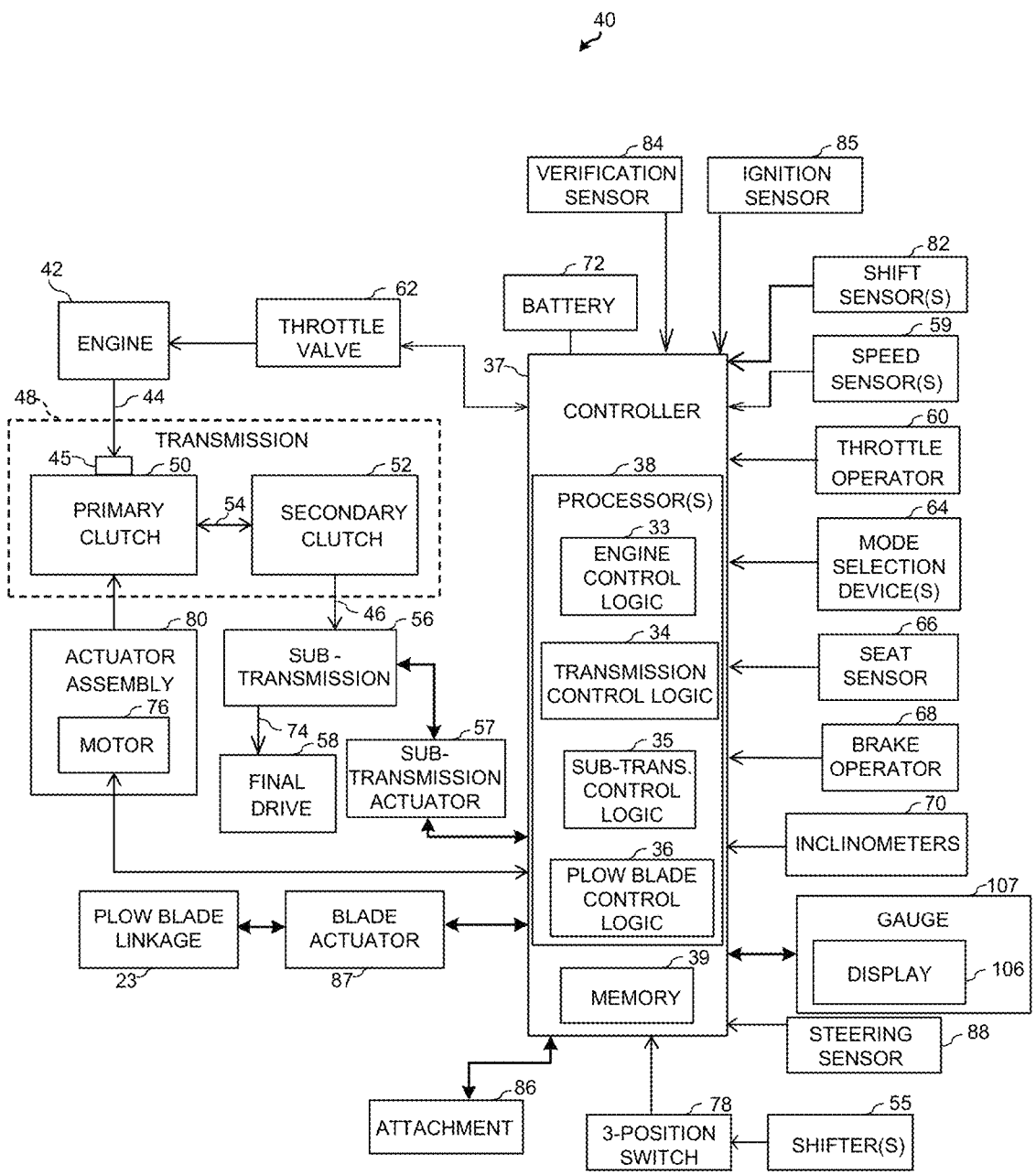
FIG. 2 is a block diagram of an exemplary control system of the vehicle of FIG. 1 including the electronically controlled sub-transmission.

To determine an on-state or off-state, the vehicle 10 may include an ignition sensor 85 (shown in FIG. 2.) The ignition sensor 85, as well as any of the other sensors discussed herein, can be hall-effect sensors.

Figure 7:
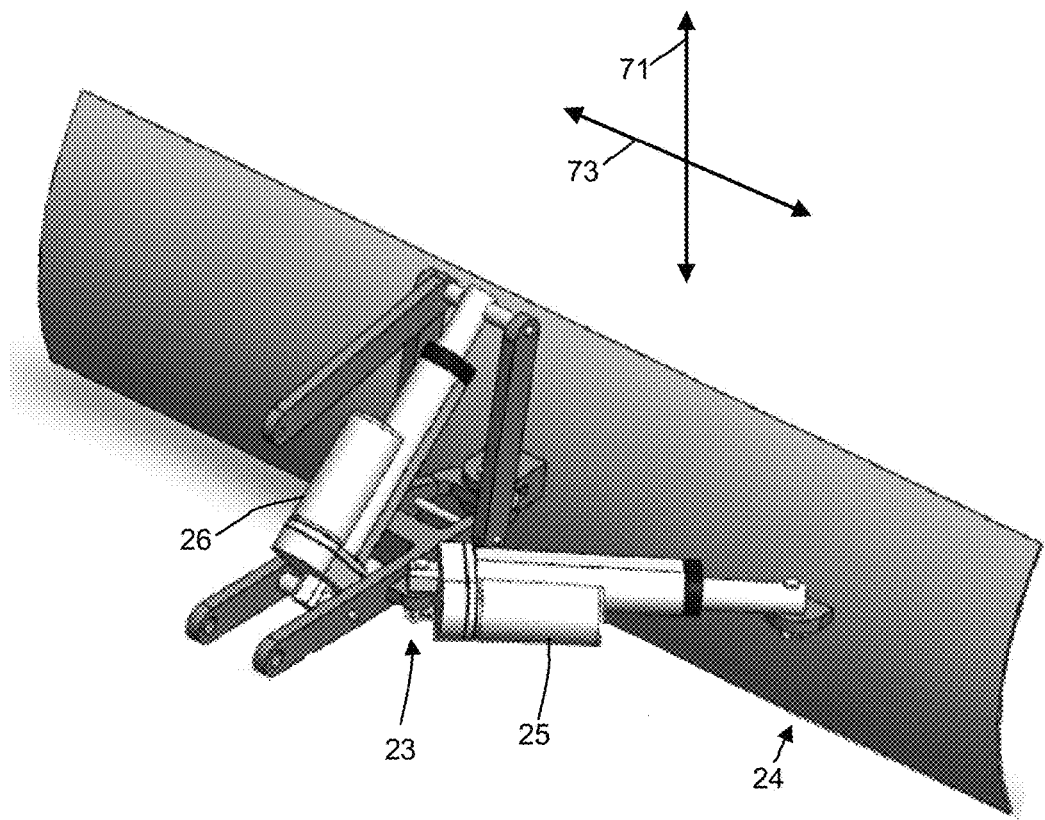
FIG. 7 is a perspective partial side view of a plow blade and plow-blade linkage of FIG. 1, according to an embodiment.

Front end 12 of vehicle 10 includes a hood 32 and a front suspension assembly 22. In embodiments, front end 12 also includes a plow-blade linkage 23 that couples a plow blade 24 to the chassis. An exemplary plow-blade linkage 23 is shown in FIG. 7 below. Front suspension assembly 22 pivotally couples front wheels 21*a* to vehicle 10. Rear end 13 of vehicle 10 includes an external storage platform 18 which serves as an engine cover extending over a power source, such as an engine 42 (see FIG. 2). Storage platform 18 is configured to secure or store one or more objects during operation of vehicle 10. Rear end 13 further includes a rear suspension assembly (not shown) pivotally coupling rear wheels 21*b* to vehicle 10. In one embodiment, a body of vehicle 10 is made of a plastic, including for example hood 32, storage platform 18, and/or side panels of vehicle 10. Other suitable vehicles may be provided that incorporate the drive system and control strategies described herein, such as a snowmobile, a straddle-seat ATV (e.g., see vehicle 310 of FIG. 11), a utility vehicle, a motorcycle, and other recreational and non-recreational vehicles.

Referring to FIG. 2, an exemplary control system 40 of vehicle 10 of FIG. 1 is illustrated including an engine 42 and a transmission 48. In embodiments, the transmission 48 is a continuously variable transmission (CVT) 48. As such, the transmission 48 may be referred to herein, interchangeably, as CVT 48. In embodiments, the CVT 48 includes a primary or drive clutch 50 and a secondary or driven clutch 52. An endless, variable speed belt 54 is coupled to the primary and secondary clutches 50, 52. Engine 42 includes an output shaft 44 configured to drive primary clutch 50 of CVT 48. Rotation of primary clutch 50 is transferred to secondary clutch 52 via belt 54. An output shaft 46 of secondary clutch 52 is coupled to and drives a sub-transmission 56, and an output shaft 74 of sub-transmission 56 is coupled to a final drive 58 for driving wheels 24 (see FIG. 1). In one embodiment, sub-transmission 56 is geared to provide a high forward gear setting, a low forward gear setting, a reverse gear setting, a neutral gear setting, and a park gear setting for vehicle 10 of FIG. 1. Fewer or additional gear settings may be provided with sub-transmission 56. Final drive 58 includes drive line components downstream of sub-transmission 56, including a drive shaft or a propeller shaft, one or more axles, differential(s), and driven wheels 24, for example.

An electronic controller 37 of control system 40 is operative to control the transmission 48, engine 42, sub-transmission 56, and plow-blade linkage 23, as described herein.

Controller 37 includes at least one processor 38 that executes software and/or firmware stored in memory 39 of controller 37. The software/firmware code contains instructions that, when executed by processor 38, causes controller 37 to perform the functions described herein. Controller 37 may alternatively include one or more application-specific integrated circuits (ASICs), field-programmable gate arrays (FPGAs), digital signal processors (DSPs), hardwired logic, or combinations thereof. The processor(s) 38 of controller 37 illustratively includes engine control logic 33 operative to control engine 42, transmission control logic 34 operative to control transmission 48, sub-transmission control logic 35 operative to control sub-transmission 56, and plow-blade control logic 36 operative to control plow-blade linkage 23 via a plow-blade-linkage actuator 87. Since transmission 48 may be a CVT 48, transmission control logic 34 may be CVT control logic 34 and, therefore, transmission control logic 34 may be referred to herein as CVT control logic 34. Controller 37 may be a single control unit or multiple control units functioning together to perform the functions of controller 37 described herein. Controller 37 may include additional components for routing signals to and from controller 37. Engine control logic 33, CVT control logic 34, sub-transmission logic 35, and plow-blade control logic 36 may be provided on a same processing device or two or more different processing devices. For example, in one embodiment CVT control logic 34 and sub-transmission logic 35 are provided on a designated vehicle or transmission control module physically separate from and in communication with an engine control module (ECM) of vehicle 10 that contains engine control logic 33 and a winch control module of vehicle 10 that contains plow-blade control logic 36. Other suitable controller arrangements may be provided.

Memory 39 is any suitable computer readable medium that is accessible by processor 38. Memory 39 may be a single storage device or multiple storage devices, may be located internally or externally to controller 37, and may include both volatile and non-volatile media. Exemplary memory 39 includes random-access memory (RAM), read-only memory (ROM), electrically erasable programmable ROM (EEPROM), flash memory, CD-ROM, Digital Versatile Disk (DVD) or other optical disk storage, a magnetic storage device, or any other suitable medium which is configured to store data and which is accessible by controller 37.

Primary clutch 50 of CVT 48 rotates on a shaft that is driven by the output shaft 44 of engine 42. In one embodiment, primary clutch 50 includes a stationary sheave and a moveable sheave that moves relative to the stationary sheave to adjust the gear ratio. CVT control logic 34 of controller 37 is operative to control an actuator assembly 80 for controlling the position of the moveable sheave of primary clutch 50 and thus the gear ratio of CVT 48. In particular, actuator assembly 80 includes a motor 76 controlled by CVT control logic 34 that adjusts primary clutch 50 to provide a target gear ratio. In an exemplary embodiment, motor 76 is an electric motor such as a stepper motor, for example, although another suitable electric or hydraulic motor may be provided. In one embodiment, actuator assembly 80 and/or controller 37 includes a motor drive that controls motor 76 based on control signals provided with CVT control logic 34. Alternatively, CVT control logic 34 may control a relay for selectively routing power to motor 76 for controlling motor 76.

In one embodiment, secondary clutch 52 is a mechanically controlled clutch 52 and includes a stationary sheave and a moveable sheave (not shown). Secondary clutch 52 is configured to control the tension of belt 54 of CVT 48 as primary clutch 50 is adjusted. In an alternative embodiment, controller 37 and actuator assembly 80 further controls secondary clutch 52 of CVT 48. A shaft 46 of secondary clutch 52 drives sub-transmission 56 (see FIG. 2). Belt 54 wraps around the primary and secondary clutches 50, 52 and transfers rotational motion of primary clutch 50 to secondary clutch 52.

A clutch assembly 45 is coupled to output shaft 44 of engine 42 to serve as a starting or launch clutch for primary clutch 50. In one embodiment, clutch assembly 45 is a dry centrifugal clutch integrated into primary clutch 50. Clutch assembly 45 is disengaged from primary clutch 50 when engine 42 is at engine idle speed. As the engine speed and the corresponding rotational speed of clutch assembly 45 increases to a threshold speed greater than engine idle speed, the centrifugal force acting on clutch assembly 45 forces clutch assembly 45 into engagement with primary clutch 50. The engine speed, according to one embodiment, refers to the rotational speed (i.e., revolutions per minute (RPM)) of the output shaft 44 of engine 42. When the rotational speed of shaft 44 decreases below the threshold clutch engagement speed, the reduced centrifugal force causes clutch assembly 45 to disengage from primary clutch 50 of CVT 48. For additional details of an exemplary CVT 48, see U.S. patent application Ser. No. 13/652,253, filed Oct. 15, 2012, entitled PRIMARY CLUTCH ELECTRONIC CVT, the entire disclosure of which is expressly incorporated by reference herein.

Sub-transmission control logic 35 of FIG. 2 is operative to control an actuator 57 for controlling a gear setting of sub-transmission 56. In one embodiment, sub-transmission actuator 57 is mounted to sub-transmission 56. In an exemplary embodiment, sub-transmission actuator 57 includes an electric motor, such as a stepper motor or other suitable motor, although any suitable sub-transmission actuator 57 may be provided. Controller 37 and/or sub-transmission actuator 57 includes a motor drive that controls the motor based on control signals provided with sub-transmission control logic 35. Alternatively, sub-transmission control logic 35 may control a relay for selectively routing power to sub-transmission actuator 57 for controlling sub-transmission actuator 57. In one embodiment, sub-transmission actuator 57 includes a manual override that allows sub-transmission 56 to be manually shifted by an operator with a mechanical tool.

Still referring to FIG. 2, a throttle operator 60 including a position sensor is coupled to an input of controller 37, and engine control logic 33 electronically controls the position of a throttle valve 62 of engine 42 based on the detected position of throttle operator 60 to regulate air intake to, and thus the engine speed of, engine 42. Throttle operator 60 may include an accelerator pedal, a thumb actuated lever, a twist grip, or any other suitable throttle input device that, when actuated by an operator, is configured to provide an operator throttle demand to controller 37. For additional disclosure of electronic throttle control provided with controller 37, see U.S. patent application Ser. No. 13/152,981, filed Jun. 3, 2011, entitled ELECTRONIC THROTTLE CONTROL, the entire disclosure of which is expressly incorporated by reference herein.

A brake operator 68 including a position or pressure sensor is also coupled to an input of controller 37. Brake operator 68 includes, for example, a foot pedal, a hand brake, or another suitable brake input device. Controller 37 detects an application (e.g., actuation) of brake operator 68 based on a signal provided by the position or pressure sensor of brake operator 68.

A display 106 is coupled to controller 37 for displaying vehicle operation information to an operator. Exemplary information provided on display 106 includes vehicle speed, engine speed, fuel level, clutch position or gear ratio of CVT 48, a gear setting of sub-transmission 56, selected operating mode, and other suitable information.

In embodiments, display 106 is incorporated into a gauge 107. In embodiments, the gauge 107 is the gauge 107 depicted in FIG. 10. A gauge 107 provides a user interface in a location that easily accessible to a user operating the vehicle 10. Preferably, the gauge 107 is mounted adjacent the driver's seat on the dashboard and/or integrated with the display 107 within the vehicle 10. In embodiments, gauge 107 includes user inputs that the driver or a passenger can select. In embodiments, different types of operating modes can be selected by a driver or a passenger of the vehicle 10. Exemplary operating modes include a plow mode, a work mode, a snow/ice mode, a sport mode, a learner mode, and other suitable modes. For additional details of an exemplary gauge 107, see U.S. patent application Ser. No. 14/190,369, filed Feb. 26, 2014, entitled RECREATIONAL VEHICLE INTERACTIVE VEHICLE INFORMATION and U.S. patent application Ser. No. 14/770,424, filed Aug. 25, 2015, entitled RECREATIONAL VEHICLE INTERACTIVE TELEMETRY, MAPPING AND TRIP PLANNING SYSTEM, the entire disclosures of which are expressly incorporated by reference herein.

In addition, or alternatively, to being able to select an operating mode using the gauge 107, one or more mode selection devices 64 in communication with controller 37 may be included in the control system 40. In embodiments, the one or more mode selection devices 64 are actuated by an operator to select an operating mode of vehicle 10. Exemplary operating modes include a plow mode, a work mode, a snow/ice mode, a sport mode, a learner mode, and other suitable modes. In one embodiment, engine control logic 33 provides variable throttle response curves based on the selected mode, for example as described in U.S. patent application Ser. No. 13/152,981, filed Jun. 3, 2011, entitled ELECTRONIC THROTTLE CONTROL, the entire disclosure of which is expressly incorporated by reference herein. Mode selection device 64 includes a toggle switch or a code entered via display 106, for example. In one embodiment, mode selection device 64 includes an ignition key having an identifier (e.g., RFID) that is readable by controller 37 for selecting a particular mode of operation. As described herein, sub-transmission 56 is controlled based on the selected operating mode.

In embodiments, vehicle 10 includes one or more shifters (e.g., shifter 55) actuated by an operator for sending shift requests to controller 37 for shifting between gear settings of sub-transmission 56, as described herein. In addition or alternatively, a shift request may be made using a CAN Bus of the vehicle 10, a gauge (e.g., the gauge 107 described in more detail below), a phone and/or other remote device. In one embodiment, shifter 55 includes the example shifter 29 of FIGS. 1, 6, and 7.

In embodiments, vehicle 10 includes speed sensors 59 that provide signals to controller 37 representative of a determined speed of the vehicle 10. Examples of speeds for the vehicle 10 can include, but are not limited to, an engine speed, a rotational speed of a wheel (or other ground engaging member), a linear ground speed of the vehicle 10 (as determined by, for example, Radar, Lidar or a global navigation satellite system (GNSS)), a rotational speed of primary clutch 50 and/or secondary clutch 52, and/or a speed of other components of the vehicle drive train (for example, a drive shaft or a propeller shaft). In one embodiment, the rotational speed of the secondary clutch is determined by measuring the RPMs of the output shaft 46. One or more of the determined speeds may be used in a control strategy for electronically controlling the sub-transmission, as described below in FIGS. 4-6 below.

In embodiments, vehicle 10 further includes shift sensors 82 that provide signals to controller 37 representative of a position of shifter 55 and/or a position of the shift-drum of the sub-transmission 56 of the vehicle 10. The shift sensors 82 may be the shift sensor 108 and the shift-drum sensor 110 depicted in FIG. 3.

In embodiments, the controller 37 is a proportional-integral-derivative (PID) controller 37 that positions the shift drum in response to a shift request. As an example, a shift sensor 82 senses the position of the shift drum and when a shift is requested via the shifter 55 (or CAN bus, gauge 107, phone and/or other remote device), the PID controller 37 repositions the shift drum in response to the shift request. As the shift drum approaches the targeted gear setting, the PID loop ramps down and slows the repositioning of the shift drum to prevent over-travelling. In embodiments, before repositioning the shift drum, the controller 37 may perform a final diagnostic check of the control system 40. In embodiments a final diagnostic check includes redundancy checks on the sensors 59, 66, 82, 84, 85, 88 and determining whether there are any overcurrents on the VCM 102 pins (see FIG. 3 and description related thereto below).

Additionally, in embodiments, the PID controller 37 may be used to monitor the current position of the shift-drum of the sub-transmission 56 (i.e., before a shift request or after a shift request) to ensure the shift-drum is in an appropriate position for the current gear setting of the sub-transmission 56. For example, the shift sensor 82 may sense a position of the shift drum and if the shift sensor 82 senses that the position of the shift drum has been moved by external forces (e.g., vibration) outside of a predetermined bound, the sub-transmission control logic 35 will be programmed so that the PID controller 37 sends a signal to the sub-transmission actuator 57 to return the sub-transmission 56 to the appropriate gear position. In embodiments, the predetermined bound of the position of the shift drum may be equal to or less than a 20 degree offset from a target position for the shift drum. In embodiments, the shift-drum and the shifter 55 have redundant shift sensors 82 to enable full plausibility checks. For PID controllers, the gains may be changed by changing the control variables to ensure the correct point on the shift drum. Alternatively to a PID controller 37, the controller 37 may involve using a current control to drive to a specific degree on the shift drum. In even other embodiments, the controller 37 includes using relays to control the on and off rotations of the shift drum. This may be done with a PI controller or current controlled field-effect-transistor (FET).

In embodiments, vehicle 10 includes one or more verification sensors 84 in communication with controller 37 for performing a redundancy check on any of the speed sensors 59 and/or shift sensors 82. Similar to the speeds sensors 59, the position sensors 82 and verification sensors 84 may be used in a control strategy for electronically controlling the sub-transmission, as described below in FIGS. 4-6 below.

In embodiments, plow-blade control logic 36 of controller 37 is operative to control a blade actuator 87 for controlling the position of the plow blade 24. In embodiments, the position of the plow blade 24 is determined from one or more settings of the blade actuator 87. The blade actuator 87 may be a brushed DC motor, hydraulic pump motor, hydraulic cylinder, linear actuator, and/or the like. The position of the plow blade 24 includes the height and/or angle of the plow blade 24. The angle of the plow blade 24 includes both the rotation of the plow blade 24 about a horizontal axis and the rotation of the plow blade 24 about a vertical axis. In embodiments, the controller 37 and the plow-blade control logic 36 receives input from a limit switch (not shown) to control the maximum amount the plow-blade linkage 23 can be retracted, in order to prevent damage to the plow-blade linkage 23 and/or vehicle 10. The maximum amount of retraction may be different when a plow blade 24 is attached to the plow-blade linkage 23 than when a plow blade 24 is not attached to the plow-blade linkage 23. In one embodiment, plow-blade-linkage actuator 87 includes a manual override that allows plow-blade linkage 23 to be manually shifted by an operator with a mechanical tool.

In embodiments, a seat sensor or switch 66 in communication with controller 37, which provides signal feedback to controller 37 indicative of the presence or absence of a load (i.e., an operator) positioned in seat 17a (and/or seat 17b) of FIG. 1 may be included in vehicle 10. (or seat 318 of FIG. 11). In one embodiment, controller 37 determines seat 17a is in a loaded state in response to detecting with sensor 66 a force on seat 17a greater than or equal to a predetermined threshold force and that seat 17a is in an unloaded state in response to the detected force being less than the threshold force. An exemplary threshold force is 50 pounds or any other suitable force. For additional details of an exemplary seat sensor 66, see U.S. patent application Ser. No. 13/725, 361, filed Dec. 21, 2012, entitled SIDE-BY-SIDE DIESEL UTILITY VEHICLE, the entire disclosure of which is expressly incorporated by reference herein.

Vehicle 10 may also include one or more inclinometers 70 in communication with controller 37 for detecting an incline or angle of vehicle relative to a horizontal plane. In embodiments, vehicle 10 also includes a steering sensor 88 in communication with controller 37 for detecting a position of the steering wheel 28. The steering sensor 88 may be used in various operating modes, as described below.

Vehicle 10 further includes a system battery 72 (e.g. 12 VDC) configured to provide power for starting vehicle 10 and to provide peripheral power to vehicle 10 during operation. In one embodiment, controller 37 communicates with one or more sensors/devices and/or controllers of vehicle 10 via controller area network (CAN) communication.

In embodiments, controller 37 of FIG. 2 is operative to electronically shift sub-transmission 56 based on a shift request provided with shifter 55. As stated above, a shift request may also be made via a CAN bus of the vehicle 10, a gauge 107, a phone and/or other remote device. In the illustrated embodiment, sub-transmission 56 includes a high-range forward gear setting, a low-range forward gear setting, a low-range reverse gear setting, a neutral gear setting, and a park gear setting. The low range forward gear setting provides increased power and lower speed operation than the high range forward gear setting. For example, the low range gear setting may be used for towing, plowing, rock crawling, hauling, or other work operations, and the high range gear setting may be used for traveling at higher speeds or in non-loaded conditions. Other suitable gear settings of sub-transmission 56 may be provided.

Figure 3:
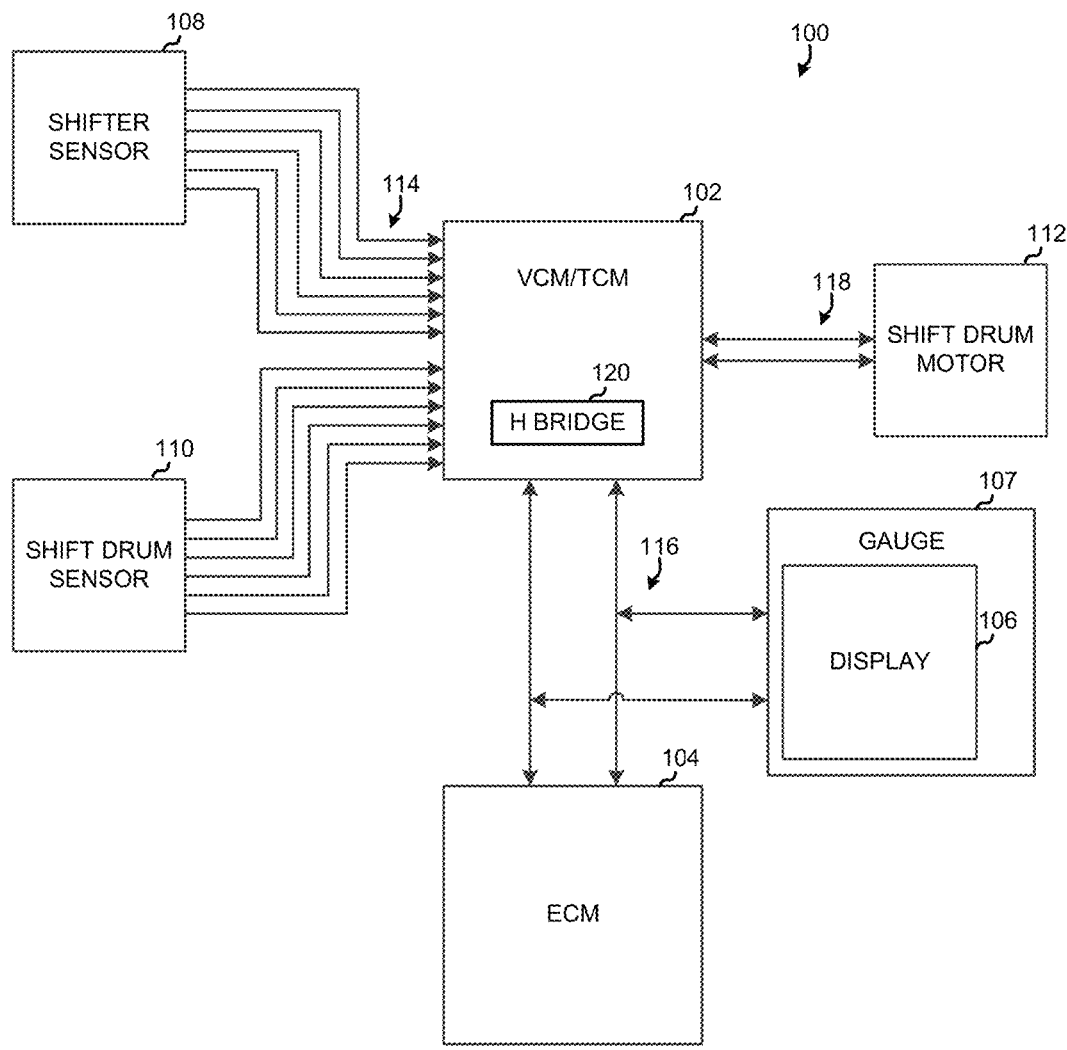
FIG. 3 is a block diagram of an exemplary implementation of the control system of FIG. 2 including a vehicle control module in communication with an engine control module.

FIG. 3 illustrates one exemplary configuration 100 of control system 40 of FIG. 2 for smart electronic control of sub-transmission 56. Referring to FIG. 3, controller 37 of FIG. 2 includes a vehicle control module (VCM) 102 (or transmission control module TCM) in communication with an engine control module (ECM) 104.

A shifter sensor 108 of shifter 55 (FIG. 2) is a rotary position sensor that senses the "Requested Gear Setting" from the user and transmits that information via analog signal to VCM 102. Another suitable signal output may be provided with shifter 55 that is configured to output a shift request signal indicative of an actuation of shifter 55.

A sensor 110 on a shift drum of sub-transmission 56 (FIG. 2) is a rotary position sensor that senses the "Current Gear Setting" of sub-transmission 56 and transmits that information via analog signal to VCM 102. Sensors 108 and 110 may alternatively transmit digital signals.

Sensors 108 and 110 illustratively include redundant signal lines 114 as well as full redundant power supply and ground lines 114 to increase the likelihood of desired operation. In one embodiment, full diagnostics are available on these inputs. VCM 102 also includes redundancy checks in the software on the signal lines 114 so that the correct gear is requested and determined.

ECM 104 broadcasts out "RPM" and "Wheel Speed" CAN signals via lines 116 and receives the "Current Gear Setting" from VCM 102. If the "Current Gear Setting" is unknown from VCM 102, ECM 104 defaults to a backup gear determination by accessing a memory lookup table based on RPM and Wheel Speed to determine the current gear setting of sub-transmission 56.

VCM 102 receives the analog inputs 114 as well as "RPM" and "Wheel Speed" inputs from ECM 104 via CAN lines 116 to make decisions on whether to execute a shift request from the user. In one embodiment, VCM 102 does not allow a shift above a calibrated RPM or wheel speed threshold to protect the transmission from unintended damage, as described herein. In certain conditions, VCM 102 disables electronic shifting and defaults to a "Mechanical Override Mode" if VCM 102 determines sub-transmission 56 cannot suitably shift, such as due to a loss of an input signal (e.g., signal from sensor 110, ECM 104, or an interlock described herein), for example. In Mechanical Override Mode, sub-transmission 56 may be shifted via a mechanical tool, such as a wrench or other tool.

An electric direct current (DC) motor 112 of actuator 57 (FIG. 2) receives a signal from VCM 102 to shift sub-transmission 56 to the requested gear setting. In one embodiment, current sensing and full diagnostics are available on this output from VCM 102. VCM 102 includes an H-bridge 120 that drives the DC control of motor 112 via lines 118. H-bridge 120 includes an electronic circuit configured to enable voltage to be applied to motor 112 in either direction to rotate the output shaft 44 of motor 112 in either direction, thereby allowing shifting in either direction through the gear range. In the illustrated embodiment, H-bridge 120 is located in the VCM 102 and is remote from motor 112. An analog or digital signal is output by H-bridge 120 to drive output shaft 44 of motor 112 a known rotational distance in the forward or reverse direction. VCM 102 detects the current position setting of motor 112 via shift drum sensor 110. VCM 102 stores calibrated set points identifying a rotational position of output shaft 44 of motor 112 that corresponds to each gear. Position tolerances are detected by controller 37 via H-bridge 120 based on a detected voltage, such as a zero to five volt signal. Controller 37 commands a target rotational position of output shaft 44 of motor 112 based on a target rotational position of output shaft 44 and a known tolerance.

In the illustrated embodiment, sub-transmission 56 includes adaptive range sensors (e.g., sensor 110) that provide position feedback to VCM 102. VCM 102 is operative to tighten tolerances for each gear position setting. In particular, by identifying the actual transmission position from sensor 110 and identifying the position tolerances, VCM 102 is operative to drive sub-transmission 56 to a predefined position.

Display 106, which may be incorporated into gauge 107, receives both "Requested Gear Setting" and "Current Gear Setting" from the CAN bus 116 and displays the "Requested Gear Setting" when it matches "Current Gear Setting." If "Requested Gear Setting" and "Current Gear Setting" do not match, display 106 flashes the "Requested Gear Setting" to provide an indication to the user that a gear shift has been requested but not executed based on suitability checks not being met in VCM 102.

Figure 4:
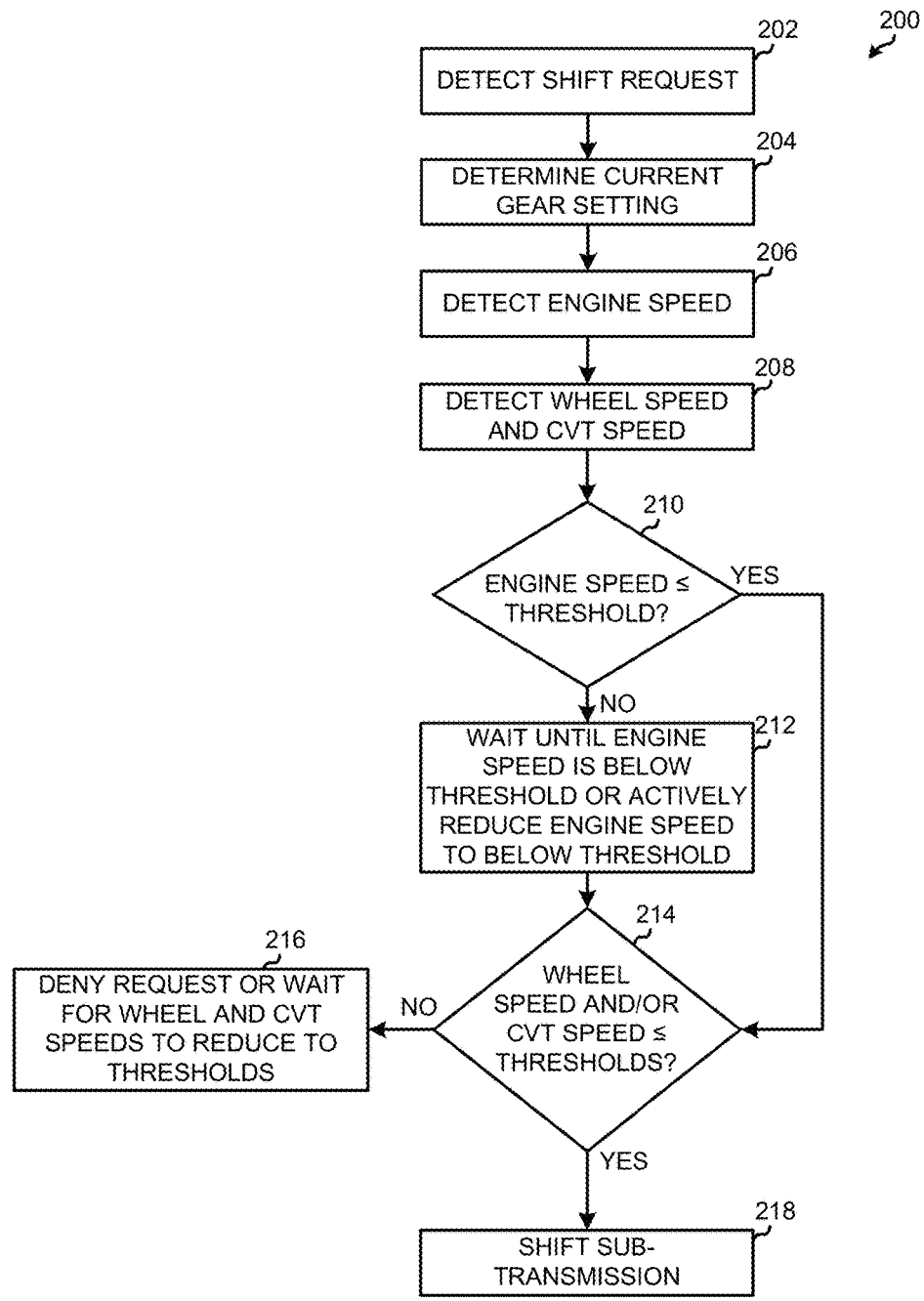
FIG. 4 is a block diagram illustrating an exemplary control strategy for electronically controlling the sub-transmission of FIG. 2.

Referring to FIG. 4, a flow diagram 200 is illustrated of an exemplary operation performed by controller 37 of FIG. 2 for electronically shifting sub-transmission 56. Reference is made to FIG. 2 throughout the following description of FIG. 4. At block 202, controller 37 detects a shift request initiated with shifter 55 (or CAN bus, gauge 107, phone and/or other remote device) that identifies a target gear setting of sub-transmission 56. Controller 37 determines the current gear setting of sub-transmission 56 at block 204 based on output from a position sensor (e.g., shift drum sensor 110 of FIG. 3). At block 206, controller 37 detects the engine speed (e.g., rotational speed, i.e., RPMs, of output shaft 44) based on output from an engine speed sensor. At block 208, controller 37 detects the wheel or ground speed and CVT speed (e.g., rotational speed, i.e., RPMs of output shaft 46) based on output from speed sensors 59 of FIG. 2. In one embodiment, a wheel speed sensor is coupled to and detects the rotational speed of output shaft 74 of sub-transmission 56 and/or an axle or wheel of final drive 58.

At block 210, controller 37 compares the detected engine speed to an engine speed threshold. At block 214, controller 37 compares the detected wheel speed and/or CVT speed to respective speed thresholds. If the engine speed is less than or equal to the engine speed threshold at block 210 and if the wheel speed and CVT speed are less than or equal to the respective speed thresholds at block 214, controller 37 shifts sub-transmission 56 to the target gear setting by outputting a control signal to actuator 57 at block 218.

If the engine speed is greater than the engine speed threshold at block 210, controller 37 can cause the sub-transmission 56 to remain in its current gear setting and wait until the engine speed threshold is satisfied. Upon the engine speed threshold being satisfied, the controller 37 instructs setting the gear setting of the sub-transmission 56 to the requested gear setting without requiring reception of an additional shift request for the requested gear setting. When the controller 37 causes the gear setting of the sub-transmission 56 to remain a current gear to due to the engine speed threshold not being satisfied, the controller 37 continues to monitor the first speed value. In certain embodiments, controller 37 causes the sub-transmission to remain in its current gear setting and actively reduces the engine speed to at or below the threshold speed at block 212 prior to implementing the gear shift. In one embodiment, controller 37 reduces the engine speed by reducing the throttle valve opening of engine 42. If the wheel speed is greater than the wheel speed threshold at block 214, or if the CVT speed is greater than the CVT speed threshold at block 214, controller 37 at block 216 either denies the shift request immediately, waits a predetermined time delay for the wheel speed and/or CVT speeds to reduce to the respective speed threshold and/or actively reduces the wheel speed and/or CVT speeds. In embodiments, once the shift engine speed, wheel speed and/or CVT speeds are at thresholds such that the controller 37 instructs setting the gear setting of the sub-transmission 56 to the requested gear setting, the controller 37 presents an interrupt mode wherein the controller 37 ceases to instruct one or more vehicle components to adopt settings causing the speed thresholds to be met. In one embodiment, if the wheel speed and/or CVT speed do not reduce to the corresponding threshold prior to expiration of the predetermined time delay (e.g., 30 seconds), controller 37 denies the shift request (e.g., clears the shift request without implementing the request). One or more of the engine speed, the wheel speed and the CVT speeds are examples of what are referred to herein as a "shift conditions."

In one embodiment, the status of the gearshift is displayed on the display 106 of the gauge 107 of FIG. 2. For example, display 106 flashes "Requested Gear Setting" or a variation thereof to provide an indication the gear shift has been requested but not implemented due to the engine speed and wheel/CVT speeds not meeting thresholds or other suitability checks not being satisfied. Display 106 also provides an indication when the gear shift has been executed and denied.

In one embodiment, the threshold engine speed of block 210 is based on the engagement speed at which clutch assembly 45 engages primary clutch 50 of CVT 48. For example, the threshold engine speed is set to a speed less than the clutch engagement speed described herein to ensure that engine 42 is decoupled from CVT 48 when the gear shift occurs. In another embodiment, the threshold engine speed of block 210 is based on the speed at which primary clutch 50 of CVT 48 engages belt 54. For example, in one embodiment, primary clutch 50 engages belt 54 in response to a speed of primary clutch 50 exceeding a belt engagement speed threshold. The threshold engine speed is set to a speed less than the belt engagement speed to ensure that primary clutch 50 is decoupled from belt 54 when the gear shift occurs. In one embodiment, the threshold wheel speed at block 214 is zero miles per hour (mph) or between zero and 5 mph. In one embodiment, the threshold CVT speed at block 214 is zero or between zero and 50 rpm. Other suitable threshold speeds may be provided at blocks 210 and 214.

In one embodiment, the method 200 of FIG. 4 allows controller 37 to verify that the engine speed, wheel speed, and CVT speed are at suitable levels before shifting sub-transmission 56 to reduce the likelihood of causing damage to the drive line of vehicle 10. For example, sub-transmission 56 is less likely to grind gears during a shift by waiting until the wheel speed and CVT speed are substantially zero prior to shifting. Similarly, by requiring the engine speed to be below the clutch engagement threshold speed, CVT 48 is decoupled from the output of engine 42 prior to shifting sub-transmission 56.

Figure 5:
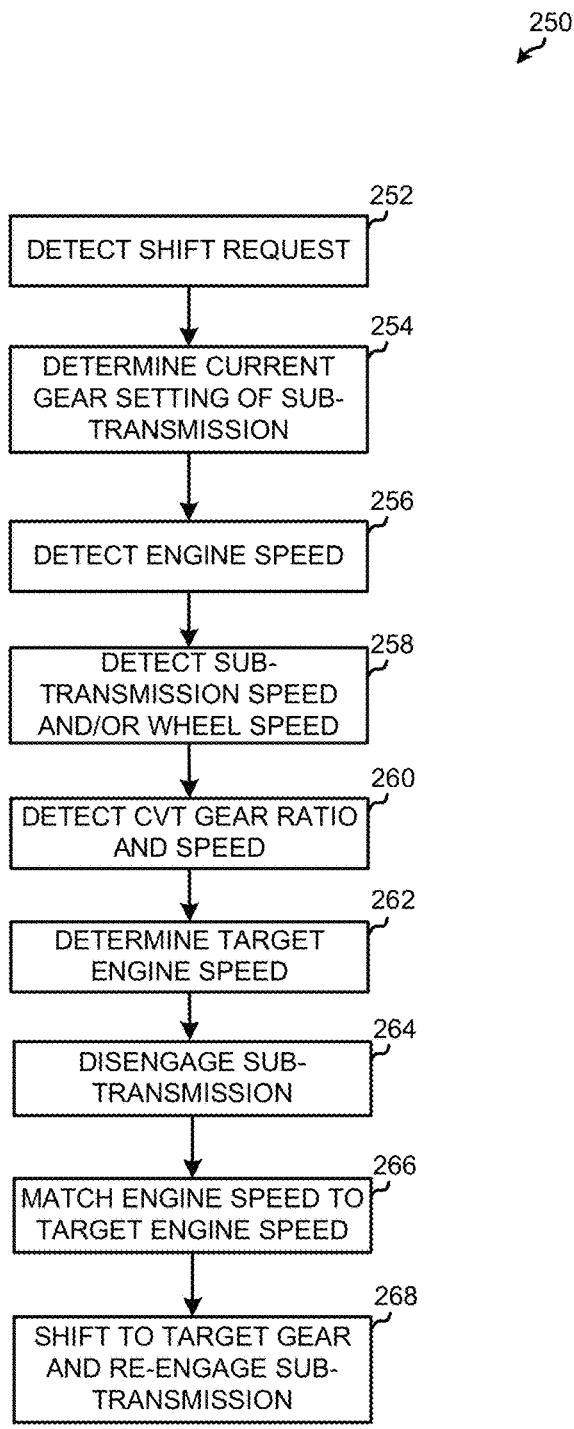
FIG. 5 is a block diagram illustrating another exemplary control strategy for electronically controlling the sub-transmission of FIG. 2.

Referring to FIG. 5, a flow diagram 250 is illustrated of another exemplary operation performed by control system 40 of FIG. 2 for electronically shifting sub-transmission 56. The method of FIG. 5 illustratively controls a rolling shift (e.g., shift on the fly) such that sub-transmission 56 is shifted while vehicle 10 is moving. In one embodiment, a rolling shift is only allowed by controller 37 when shifting between forward gears (e.g., between high range and low range) or when shifting between neutral gear setting and forward or reverse gear settings, although other suitable shifting conditions may be provided for a rolling shift. Reference is made to FIG. 2 throughout the following description of FIG. 5.

At block 252, controller 37 detects a shift request initiated with shifter 55 (or CAN bus, gauge 107, phone and/or other remote device) that identifies a target gear setting of sub-transmission 56. Controller 37 determines the current gear setting of sub-transmission 56 at block 254 based on output from a shift sensor (e.g., shift drum sensor 110 of FIG. 3). At block 256, controller 37 detects the engine speed. At block 258, controller 37 detects the speed of sub-transmission 56 and/or the wheel (ground) speed. The engine speed, the speed of sub-transmission and/or the wheel speed can be determined based on an output from the speed sensors 59 of FIG. 2. At block 260, controller 37 determines the gear ratio of CVT 48 and a speed of CVT 48, illustratively the speed of output shaft 46 of FIG. 2. At block 262, controller 37 determines a target engine speed based on the current and target gear settings of sub-transmission 56, the gear ratio of CVT 48, the output speed of CVT 48 (e.g., rotational speed, i.e., RPMs, of output shaft 46 of secondary clutch 52), and the wheel speed and/or speed of sub-transmission 56. A target engine speed based on the current and target gear settings of sub-transmission 56, the gear ratio of CVT 48, the output speed of CVT 48 (e.g., speed of output shaft 46 of secondary clutch 52), and the wheel speed and/or speed of sub-transmission 56 are examples of what may be referred to herein as "shift conditions." As an example, controller 37 determines the target engine speed required to drive CVT 48 such that the speed of output shaft 46 of CVT 48 will match the speed of the input of sub-transmission 56 after sub-transmission 56 is shifted to the requested target gear setting. For example, the speeds of output shaft 46 and the input of sub-transmission 56 match when the rotational speeds are the same or are within a predefined range of each other, such as within 50 RPM, for example. In embodiments, the predefined ranges differ and are dependent upon which gear setting is requested as the target gear setting. Accordingly, the likelihood of grinding or damaging gears and other components of sub-transmission 56 during a rolling shift is reduced.

At block 264, controller 37 disengages sub-transmission 56 from CVT 48. In one embodiment, disengaging sub-transmission 56 includes shifting sub-transmission 56 to a neutral space or dead spot between gear positions. In another embodiment, sub-transmission 56 includes a clutch controlled by controller 37 to disengage sub-transmission 56 from CVT 48. At block 268, while sub-transmission 56 is disengaged, controller 37 adjusts the engine speed to match the target engine speed calculated at block 262 by electronically controlling throttle valve assembly 62 of FIG. 2. In the illustrated embodiment, the engine speed matches the target engine speed when the engine speed is the same as the target engine speed or is within a predetermined threshold range of the target engine speed, such as within 50 RPM, for example. When the engine speed sufficiently matches the target engine speed, and thereby the speed of output shaft 46 sufficiently matches the post-shift input speed of sub-transmission 56, controller 37 at block 270 shifts sub-transmission 56 to the target gear setting identified in the shift request and re-engages sub-transmission 56 to CVT 48. As described herein, controller 37 shifts sub-transmission 56 by outputting a shift command to actuator 57. In an embodiment with a clutch disengaging sub-transmission 56 from CVT 48, controller 37 drives engine 42 to the target speed before, during, or after shifting sub-transmission 56 to the target gear setting and before re-engaging sub-transmission 56 via the clutch.

Figure 6:
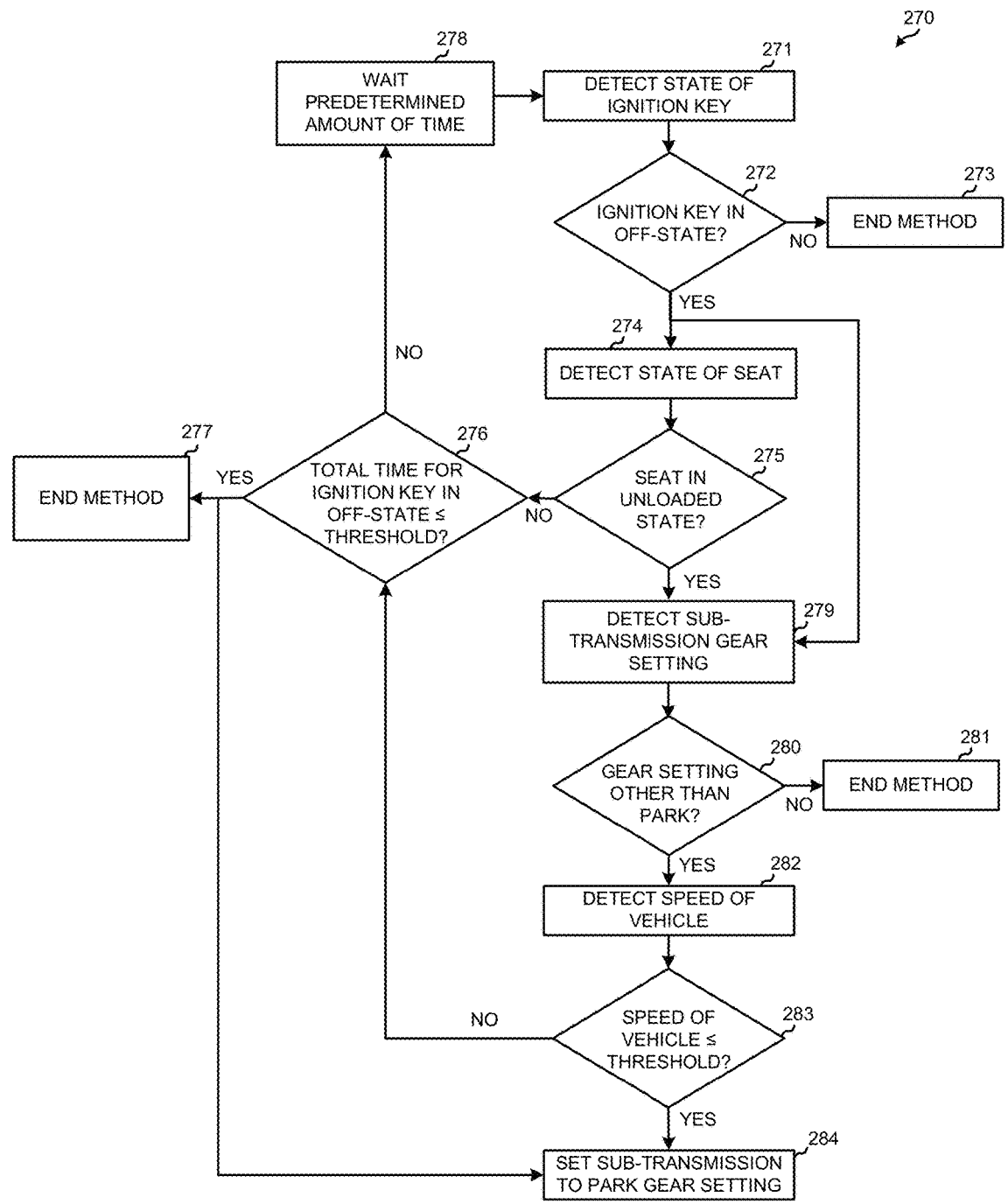
FIG. 6 is a block diagram illustrating another exemplary control strategy for electronically controlling the sub-transmission of FIG. 2.

Referring to FIG. 6, a flow diagram of a method 270 is illustrated of another exemplary operation performed by control system 40 of FIG. 2 for electronically shifting sub-transmission 56. The method 270 depicted in FIG. 6 is an example of what may be referred to as an "auto-park feature" of control system 40. In embodiments, the method 270 results in controller 37 automatically shifting sub-transmission 56 into a park gear setting in response to certain park conditions being satisfied. In embodiments, a first set of park conditions include the ignition being in the off-state, the sub-transmission having a gear setting other than the park gear setting and the at least one sensor indicating a first speed value is at or below a threshold, as discussed in detail below. Reference is made to FIG. 2 throughout the following description of FIG. 6.

At block 271, controller 37 detects whether the ignition is in an on-state or an off-state. In embodiments, the ignition sensor 85 depicted in FIG. 2 may be used to detect whether the ignition is in an on-state or an off-state. As described above, when an ignition key for the vehicle 10 is either inserted into the ignition and turned to an "on" setting or the ignition key (or token) is in the proximity of the ignition system followed by activation of a push-button start, the ignition may be referred to herein as being in an "on-state." If the ignition is not turned to an on setting or has not been activated by a push-button, the ignition may be referred to herein as being in an "off-state." In embodiments, for each of the sensors in method 270 used to detect various parameters of the vehicle 10, there may be redundant sensors included in method 270 to verify that accuracy of the sensors.

At block 272, if the ignition is not in an off-state, then the method 270 proceeds to block 273 and the method 270 ends. If, however, the ignition is in an off-state, then, in embodiments, method 270 may proceed to block 274 to detect a state of the seat 17a. Alternatively, method 270 may proceed to block 279 to detect a sub-transmission 56 gear setting. In embodiments, the seat sensor 66 depicted in FIG. 2 may be used to detect the state of the seat 17a. The seat 17a may have two states, an unloaded state and a loaded state, as described above in FIG. 2. At block 275, if the seat 17a is a loaded state, then method 270 proceeds to block 276 to determine whether a total time the ignition has been in an off-state is at or exceeds a predetermined threshold. If the ignition has been in an off-state for a total time greater than or equal to a pre-determined threshold, then the method 270 may proceed to block 277 where method 270 ends. In certain embodiments, the total time for the pre-determined threshold may be 5 min., 10 min., 15 min. and/or the like. This embodiment provides for saving the battery power of the vehicle 10, in that the controller 37 is not endlessly running the method 270. Alternatively, in embodiments, if the ignition has been in an off-state for a total amount of time greater than or equal to a pre-determined threshold, then the method 270 proceeds to block 284 where the controller 37 automatically shifts sub-transmission 56 into the park setting. When the sub-transmission has a gear setting other than the park gear setting and the ignition has been in an off state for at least a threshold amount of time, these embodiments are examples of what are referred to herein as a second set of park conditions. This embodiment may be helpful if one or more of the sensors are faulty. If, however, the ignition has not been in an off-state for a total time greater than or equal to a pre-determined threshold, then the method 270 proceeds to 278 where method 270 waits a predetermined amount of time before again detecting the state of the ignition at block 271. In certain embodiments, the predetermined amount of time for block 278 is less than the threshold for the total time at block 276. For example, the predetermined amount of time at block 278 is illustratively 30 seconds, 1 min., 2 min. and/or the like.

Referring back to block 275, if the seat 17a is determined to be in a loaded state, method proceeds to block 279 where the gear setting of the sub-transmission 56 is detected. In certain embodiments, the shift sensor 82 depicted in FIG. 2 is used to determine the gear setting of the sub-transmission 56. At block 280, if the sub-transmission 56 is detected to be in a park gear setting, then method 270 proceeds to block 281 where method 270 ends. If, however, the gear setting of the sub-transmission 56 is in a gear other than the park gear setting, method 270 proceeds to block 282 where method 270 detects at least one first value of the vehicle 10 from a group of ground speed of the vehicle 10 and a speed of a component of the vehicle 10. In certain embodiments, the speeds sensor(s) 59 depicted in FIG. 2 are used to detect at least one first speed value of the vehicle 10. Examples of detected speeds for the vehicle 10 include, but are not limited to, an engine speed (crankshaft or other RPM), a rotational speed of a wheel (or other ground engaging member), a linear ground speed of the vehicle 10 (as determined by, for example, Radar, Lidar or a global navigation satellite system (GNSS)), a rotational speed of primary clutch 50 and/or secondary clutch 52, and/or a speed of other components of the vehicle drive train (for example, a drive shaft or a propeller shaft).

At block 283, if the detected speeds are not less than a threshold, then method 270 proceeds to block 276. If, however, the detected speeds are less than a threshold, then method 270 proceeds to block 284 where the controller 37 shifts the sub-transmission 56 into the park gear setting. In certain embodiments, detected speeds are less than or equal to a threshold to permit shifting the sub-transmission 56 into the park gear setting. In other embodiments, detection of only one or more of the detected speeds that are less than or equal to a threshold permit shifting the sub-transmission 56 into the park gear setting. In embodiments, the threshold is zero. In embodiments, the threshold may be set to incorporate a tolerance window into the threshold. For example, if one or more of the sensors can only achieve an accuracy of +/−10%, the threshold may be adjusted up to account for such accuracy.

In certain embodiments, controller 37 only shifts sub-transmission 56 into the park gear setting if the conditions of method 270 are met and vehicle 10 is positioned at an incline which exceeds a threshold inclination angle, as determined with inclinometers 70 of FIG. 2. As such, vehicle 10 is less likely to roll down a hill when vehicle 10 is left unattended by an operator. In one embodiment, a user input overrides the auto-park feature to allow vehicle 10 to be towed when engine 42 or vehicle 10 is shutdown. For example, controller 37 allows a user to shift sub-transmission 56 into neutral gear setting while engine 42 is shut down to disengage CVT 48 from final drive 58 for towing operations.

In further embodiments, controller 37 is further operative to lock sub-transmission 56 in the park gear setting when vehicle 10 is shut down, either automatically as described in method 270 or in response to a lockout request by a user (e.g., a code entered). When locked in the park gear setting, controller 37 requires a set of conditions to be satisfied before allowing sub-transmission 56 to shift out of the park gear setting. For example, controller 37 requires one or more of the following conditions to be met before shifting out of the park gear setting: the presence of a key is detected in the ignition or near the ignition (via RFID or key fob), seat 17a is in the loaded state, the seat belt is engaged, and a brake interlock is satisfied. In one embodiment, controller 37 further requires engine 42 to be running to execute a shift request for shifting out of the park gear setting. For the brake interlock, controller 37 detects an application of brake operator 68 of FIG. 2 based on feedback provided by the brake operator sensor (e.g., pressure sensor or position sensor). In this embodiment, controller 37 requires brake operator 68 to be engaged by the operator by a threshold pressure or displacement amount prior to shifting into the park gear setting.

In one embodiment, the conditions for unlocking or locking a particular gear setting are displayed on display 106. For example, the conditions for shifting sub-transmission 56 out of the park gear setting are listed on display 106 to inform the operator what steps to take to shift out of the park gear setting. Similarly, the interlocks and corresponding locked out gear settings are displayed on display 106, such as when the seat belt, doors, or side nets are disengaged and the seat is unoccupied.

Referring again to FIG. 2, when a mode is selected via a mode selection device 64 and/or the gauge 107, the sub-transmission control logic 35 may include instructions that prevents the controller 37 from sending a signal to the sub-transmission actuator 57 to shift the sub-transmission 56 to a first gear setting when the controller 37 receives a shift request signal that requests the first gear. For example, when the rock crawling mode is selected, the first gear setting may be a high-speed setting, e.g., the high-forward gear setting. Preventing a shift request in this manner may help prevent damage to the vehicle 10 and/or the driver of the vehicle 10.

In embodiments, the sub-transmission control logic 35 also includes a first set of conditions in which gear shifting is permitted. The first set of conditions may be responsive to the selected operating mode. In embodiments, the sub-transmission control logic 35 also includes a first set of gear ratios that are permitted for at least one of the sub-transmission 56 and the transmission 48. Similarly, the first set of gear ratios may be responsive to the selected operating mode.

plow mode is selected via a mode selection device 64 and/or the gauge 107, to cause alteration of the blade actuator 87 responsive to a detected speed of the vehicle (e.g., a ground speed of the vehicle), responsive to a detected setting of the steering input device, as determined by the steering sensor 88, and responsive to a detected position of the plow blade 24 coupled to the vehicle using the plow-blade linkage 23. For example, the plow-blade control logic 36 may increase the angle of the plow blade 24 as the steering angle, as determined by the steering wheel position 28, increases. The plow-blade control logic 36 may also be set so that the angle of the plow blade 24 is less (or more) sensitive to the steering angle. As another example, the angle of the plow blade 24 may decrease as the ground speed of the vehicle 10, as measured by a speed sensor 59, increases and vice-versa.

In embodiments, controller 37 is further operative, when a plow mode is selected via a mode selection device 64 and/or the gauge 107, to control a position of the plow blade 24 responsive to a determined gear setting of the sub-transmission 56. For example, when the sub-transmission 56 is in a forward gear, the plow-blade control logic 36 may lower the plow blade 24. Conversely, when the sub-transmission 56 is in a reverse gear, the plow-blade control logic 36 may raise the plow blade 24. In embodiments, when plow mode is selected, controller 37 locks out high range forward gear setting such that the user cannot select the high range setting or such that an override input is required to select the high range setting. An override input may include a code or other input via display 106 of FIG. 2.

Furthermore, in embodiments, a user can configure the plow-blade control logic 36 to set predetermined plow blade 24 positions (e.g., height, angle about a vertical axis, and angle about a horizontal axis) when the plow mode is selected. After one or more of the plow blade 24 positions are configured, the plow-blade control logic 36 may reposition the plow blade 24 to the configured plow blade position when the user selects the pre-configured plow blade 24 setting via the display 106 and/or gauge 107.

As stated above, in embodiments, the position of the plow blade 24 is determined from one or more settings of the blade actuator 87. Accordingly, the plow-blade control logic may set the plow blade 24 to one or more pre-configured positions by determining a current position of the plow blade 24, a speed at which the plow blade 24 can be repositioned using the plow-blade linkage 23 and solving for the time that the plow-blade-linkage actuator 87 needs to be actuated for the plow blade 24 to be repositioned to one or more of the predetermined plow positions.

FIG. 7 is a perspective partial side view of a plow blade 24 and plow-blade linkage 23 of FIG. 1, according to an embodiment. In embodiments, the plow-blade linkage 23 includes hydraulic pistons 25, 26 that can be actuated by a blade actuator 87 (of FIG. 2) to control the angle and height of the plow blade 24. In particular, the hydraulic piston 25 can be actuated by a blade actuator 87 to rotate the plow blade 24 about a vertical axis 71. Furthermore, the hydraulic piston 26 can be actuated by a blade actuator 87 to rotate the plow blade 24 about a horizontal axis 73. In embodiments, the plow-blade linkage 23 can include a winch coupled the plow blade 24 that can be actuated to raise and lower the plow blade 24. In embodiments, the hydraulic pistons 25, 26 are replaced with a plurality of winches.

In embodiments, controller 37 locks out one or more gear settings, such as the high range gear setting, in response to detecting a seat belt being disengaged and/or the operator leaving seat 17a (FIG. 1). Controller detects the loaded and unloaded state of seat 17a based on the force detected with seat sensor 66, as described herein. If vehicle 10 is being driven in the high range gear setting when the disengaged seat belt or unloaded seat 17a is detected, controller 37 in one embodiment automatically shifts sub-transmission 56 into the low range gear setting and locks out the high range setting until the seat belt is engaged and the seat 17a is in the loaded state. A suitable time delay (e.g., one to five seconds, etc.) may be implemented after detecting the unloaded seat or disengaged seat belt before automatically shifting into the low range gear setting. Controller 37 may further reduce or limit the throttle opening to a threshold opening upon detecting the unloaded seat or disengaged seat belt. In one embodiment, when sub-transmission 56 is in the park gear setting or neutral gear setting while engine 42 is running, controller 37 locks out the forward and reverse gear settings until the seat belt is engaged and the operator is positioned in seat 17a. Other interlocks may be monitored in addition to the seat belt and seat 17a engagement, such as the engagement of side nets or doors of vehicle 10. In one embodiment, controller 37 locks out one or more gear settings of sub-transmission 56 by ignoring or not executing shift requests for the locked out gear settings.

In one embodiment, engine 42 is configured to operate in a power generation mode. The generated power output by engine 42 is used, for example, to power a hydraulic pump or generate electricity. Power generation mode is selectable via mode selection device 64 and/or gauge 107 of FIG. 2. In the power generation mode, controller 37 shifts sub-transmission 56 into the neutral gear setting to decouple the output of engine 42 and CVT 48 from the final drive 58. Controller 37 is operative to lock out other gear settings of sub-transmission 56 during the power generation mode regardless of a shift request for a different gear setting.

Figure 8:
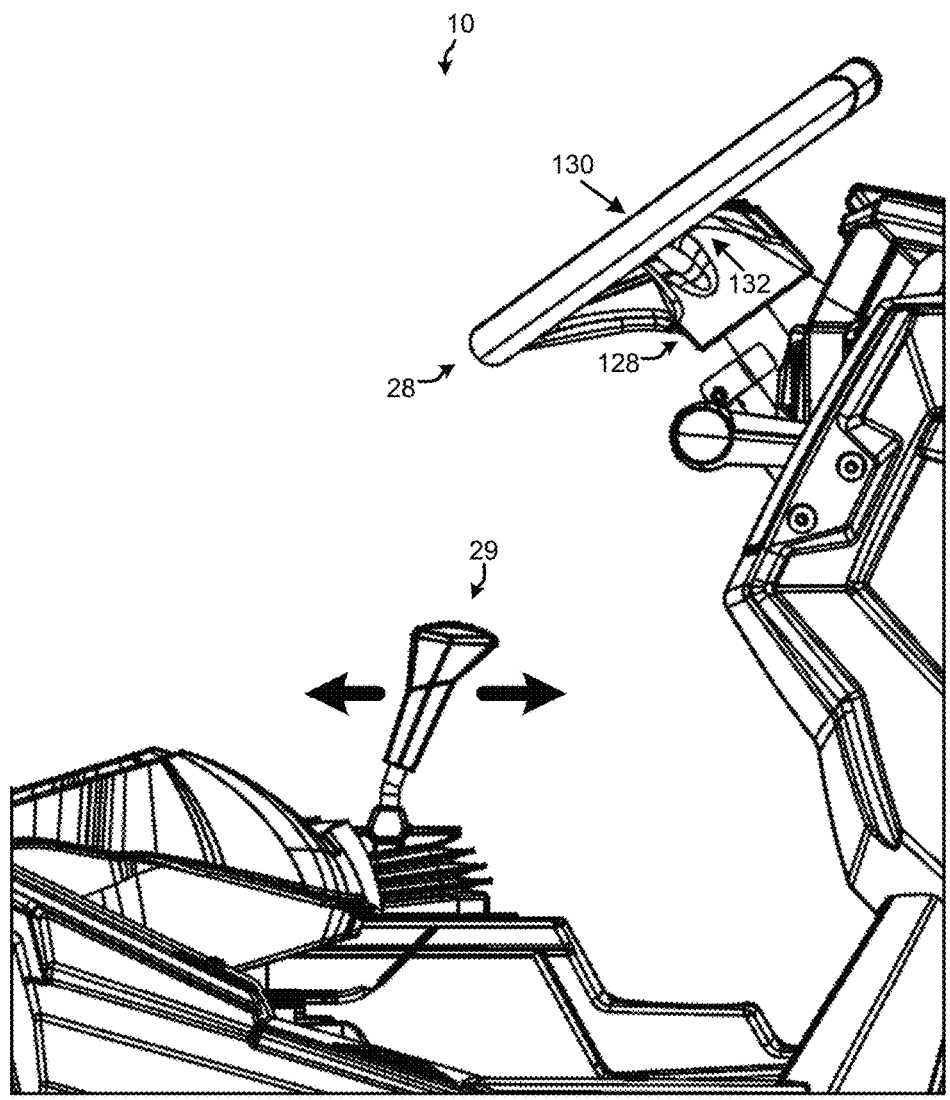
FIG. 8 is a perspective partial side view of the vehicle of FIG. 1 illustrating an example shifter and a steering wheel according to an embodiment.

Referring to FIG. 8, an exemplary shifter 55 of FIG. 2 is illustrated in the form of a shift handle or lever 29 positioned between seats 17a and 17b of vehicle 10 (FIG. 1). Shift handle 29 is configured to move in the forward (shift up) direction toward the front of vehicle 10 and the backward (shift down) direction toward the rear of vehicle to allow an operator to shift through the gear settings of sub-transmission 56. Shift handle 29 is coupled to a shift sensor for communicating the shifter position to controller 37. In one embodiment, the shift sensor includes a three-position, momentary ON-OFF-ON toggle switch 78 (see FIG. 2). Switch 78 is spring-biased to the middle OFF position, and moving shift handle 29 forward or backward causes contacts of switch 78 to engage an ON position to generate a corresponding shift request to controller 37. Accordingly, shift handle 29 is biased to the middle position illustrated in FIG. 8, and actuation of shift handle 29 forward or reverse initiates a shift request.

In the illustrated embodiment, the duration of input provided with shift handle 29 serves to request a different sub-transmission gear setting. For example, shift handle 29 may be actuated for a short hold (short duration) or a long hold (long duration). A short hold is an actuation of the shift handle 29 to the forward or backward position held for less than a threshold duration, and a long hold is an actuation of shift handle 29 in the forward or backward position held for longer than the threshold duration. An exemplary threshold duration is 300 milliseconds (ms), 500 ms, or another suitable threshold duration programmed into controller 37. In one embodiment, the shift input provided by shift handle 29 is filtered by controller 37 to reduce the likelihood of shifting in response to an inadvertent shift request, such as a shift request resulting from an accidental bump to shift handle 29, for example. An exemplary filter includes controller 37 ignoring shifter actuations held for less than a second threshold duration, such as 100 ms, for example.

In the illustrated embodiment, a short hold on shift handle 29 in the forward or backward position allows for stepping through the gear settings of sub-transmission 56. An exemplary gear setting pattern is park-reverse-neutral-low range forward-high range forward (PRNLH). With sub-transmission 56 in the park gear setting, actuation of shift handle 29 forward for a short duration requests reverse gear setting, a subsequent forward short hold actuation requests neutral gear setting, a subsequent forward short hold actuation requests low range setting, and a subsequent forward short hold actuation requests high range setting. Similarly, reverse short hold actuations on shift handle 29 result in stepping backward through the gear range settings of sub-transmission 56.

In one embodiment, a long hold on shift handle 29 provides for shifting directly to the end gear setting of the gear range settings based on the direction shift handle 29 is actuated. For example, in the PRNLH gear pattern, when sub-transmission 56 is in the park setting, the reverse setting, the neutral setting, or the low range setting, a long hold actuation of shift handle 29 in the forward direction generates a shift request for the high range setting. Similarly, when sub-transmission 56 is in the reverse setting, the neutral setting, the low range setting, or the high range setting, a long hold actuation of shift handle 29 in the backward direction generates a shift request for the park gear setting.

In one embodiment, the long hold input with shift handle 29 is configured differently for different operating modes. For example, in the plow mode or work mode, a long hold on shift handle 29 in the forward or backward direction causes sub-transmission 56 to shift directly between low forward range setting and reverse gear setting, respectively. The configuration of the long hold input is selectable by an operator based on the operating mode selected with mode selection device 64 of FIG. 2. In one embodiment, the long hold input configuration is programmable into controller 37 via a user input (e.g., via buttons of display 106 or other input device) to identify which gear settings are selected in response to long hold actuations of shift handle 29.

In another embodiment, shift handle 29 is moveable to a different detent position for each different gear setting of sub-transmission 56. Based on the position of shift handle 29, controller 37 shifts sub-transmission 56 to a different gear setting. In the PRNLH gear range described above, shift handle 29 has five different detent positions each corresponding to one of park, reverse, neutral, low forward range, and high forward range.

In an alternative embodiment, shifter 55 of FIG. 2 is separated into right-hand and left-hand controls provided with two shifters, such as paddles or buttons, coupled on or near steering wheel 28. For example, right-and left-hand shifters 55 of FIG. 2 may be coupled to the right and left side of steering wheel 28 near position 130 of FIG. 8 inside the outer perimeter of steering wheel 28. Similarly, right-and left-hand shifters 55 may be coupled to opposite sides of steering column 128 behind steering wheel 28. For example, the right-hand shifter 55 may be coupled to steering column 128 at position 132 of FIG. 8, and the left-hand shifter 55 may be coupled at a similar position on the opposite side of steering column 128. As such, an operator may shift through the gear settings of sub-transmission 56 while keeping both hands positioned on steering wheel 28.

Figure 11:
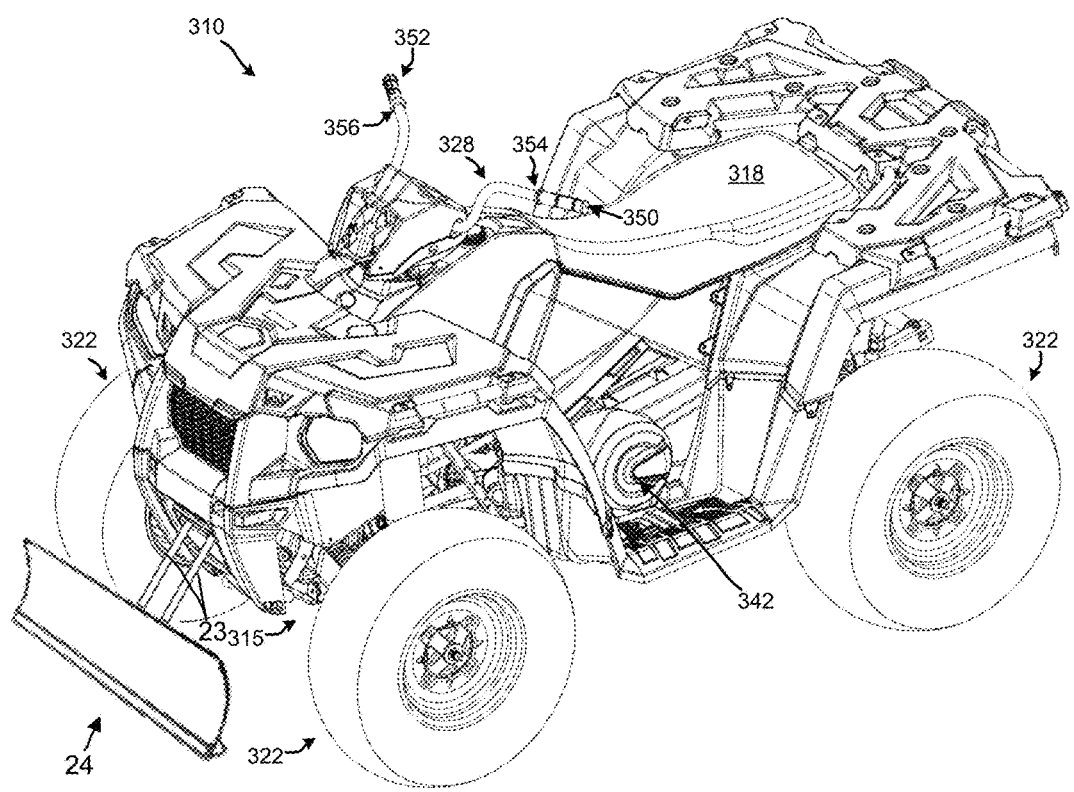
FIG. 11 is a perspective view of another exemplary vehicle incorporating the electronically controlled sub-transmission of the present disclosure.

For a straddle-type vehicle (e.g., all-terrain vehicle or snowmobile), the hand shifters 55 are coupled to right and left sides of the handlebar near the location of an operator's hands. Referring to FIG. 11, an exemplary straddle seat vehicle 310 is illustrated that incorporates the control system 40 of FIG. 2 and described herein. Straddle-type vehicle 310 includes a frame or chassis 315 that is supported above the ground surface by front and rear wheels 322. Vehicle 310 includes a straddle seat 318 positioned above an engine 342 and behind a steering device, illustratively a handlebar 328. Handlebar 328 includes a left grip 350 and a right grip 352. A left-hand shifter 55 (FIG. 2) is coupled to handlebar 328 at location 354, and a right-hand shifter 55 (FIG. 2) is coupled to handlebar 328 at location 356. Locations 354 and 356 are adjacent or near respective grips 350, 352 such that an operator may shift through the gear settings of sub-transmission 56 (FIG. 2) while keeping both hands positioned on handlebar 328. Shifters 55 of straddle type vehicle 310 include paddles, buttons, or other suitable shift request devices. In embodiments, vehicle 310 may also include a plow-blade linkage 23 coupling the plow blade 24 to the frame or chassis 315.

In the embodiments of FIGS. 7 and 8 including right-hand and left-hand shifters 55, each shifter 55 is coupled to a two position, ON-OFF momentary toggle switch biased in the OFF position. In one embodiment, each short hold actuation to the left-hand shifter 55 controls gear selections in the up direction (e.g., from park gear setting to high forward range setting), and each short hold actuation to the right-hand shifter 55 controls gear selections in the down direction (e.g., from high forward range setting to park gear setting), or vice versa. Similarly, a long hold actuation on right-hand or left-hand shifter 55 causes sub-transmission 56 to jump to a corresponding end of the gear range setting (e.g., high forward range setting for left hand device 55 and park gear setting for right-hand device 55) or to a particular gear setting based on the selected operating mode (e.g., shift directly between reverse and low forward range settings for work or plow mode).

Figure 9:
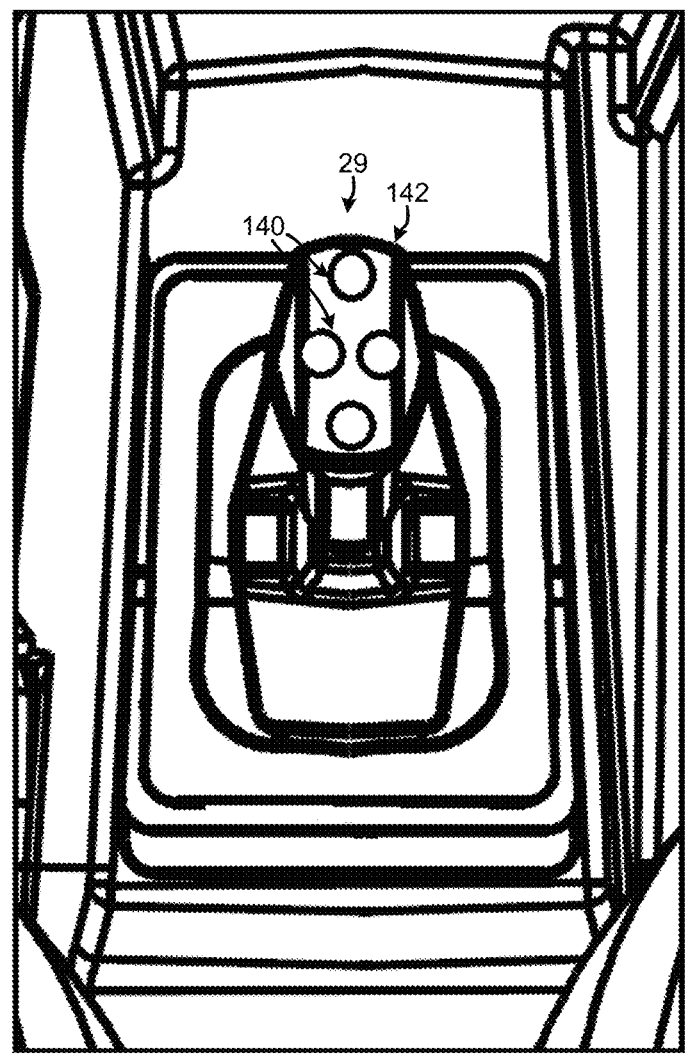
FIG. 9 is a perspective top view of the example shifter of FIG. 8 including control input devices for controlling an accessory.

In one embodiment, shifter 55 of FIG. 2 includes one or more additional input devices, such as buttons or toggle switches, configured to control an implement or attachment 86 (FIG. 2) or other accessory coupled to the vehicle and controlled by controller 37. Referring to FIG. 9, shift handle 29 includes a plurality of buttons 140 coupled to a head portion 142 of shift handle 29. Buttons 140 are thumb or finger actuated, for example, to provide user accessibility without requiring the user to remove a hand from shift handle 29. Buttons 140 are in communication with controller 37 and provide various functionalities based on the operating mode selected with mode selection device 64 of FIG. 2. For example, in a plow mode, buttons 140 allow an operator to control the position and orientation of a plow blade or scoop attached to the front of vehicle 10. In a work mode, buttons 140 provide input to controller 37 for controlling a winch coupled to vehicle 10, i.e., for controlling the winch motor to retract and extend the winch cable. Buttons 140 may also be used to start, stop, and otherwise control power generation provided with engine 42 (FIG. 2) in a power generation mode. A position, orientation, and operation of a snow blower attachment may also be controlled with buttons 140. Other suitable functionality may be provided with buttons 140 for controlling an attachment 86 of vehicle 10.

In another embodiment, vehicle 10 of FIG. 1 includes a hydrostatic transmission rather than the CVT 48 of FIG. 2. In another embodiment, vehicle 10 includes a sequential transmission rather than the CVT 48 and sub-transmission 56 of FIG. 2. In this embodiment, the sequential transmission is electronically shifted by controller 37 according to the control strategies described herein. An exemplary gear range setting pattern of a sequential transmission includes reverse gear setting-first gear setting-second gear setting-third gear setting-fourth gear setting-fifth gear setting (R12345), and each gear setting is electronically controlled by controller 37 based on shift requests from shifter 55 of FIG. 2 as described with respect to sub-transmission 56 of FIG. 2. The sequential transmission may have fewer or additional gear settings.

Figure 10:
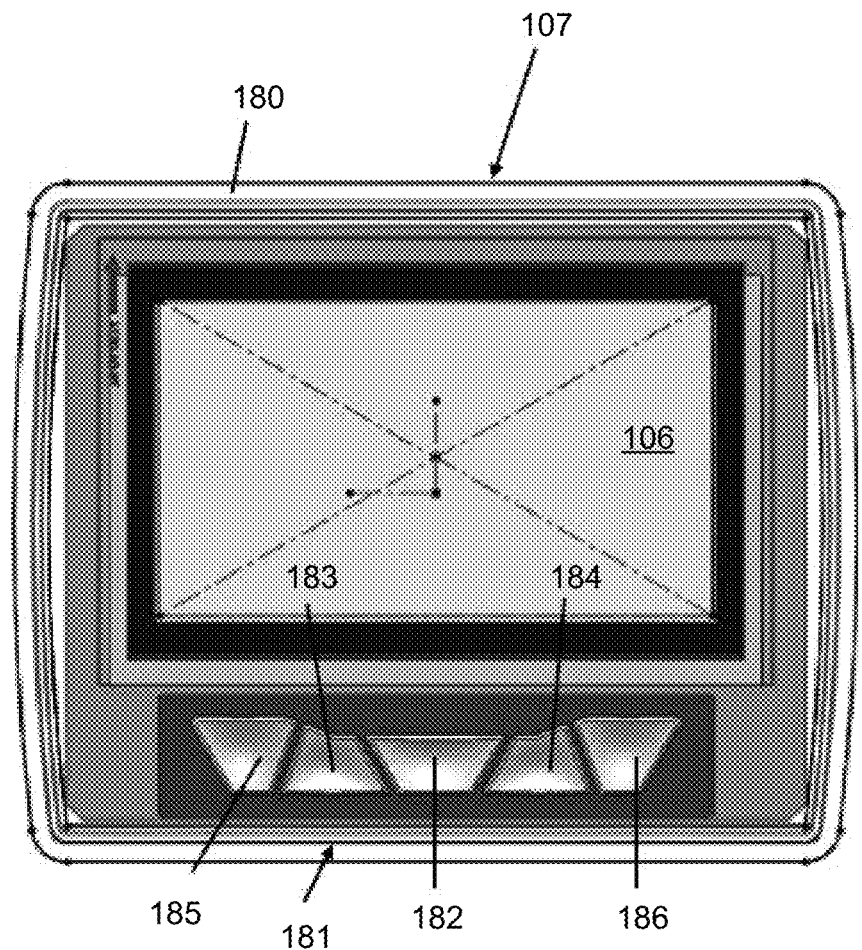
FIG. 10 is a perspective view of an exemplary gauge of FIG. 2, according to an embodiment.

Referring to FIG. 10, a perspective view of an exemplary gauge 107 is depicted. The gauge 107 includes a body portion 180 housing a display 106. A plurality of selection buttons 181 permit the user to control various features and functions of the present system as described herein, such as selecting an operating mode (e.g., plow mode, as described above). In an illustrated embodiment, the center button 182 is a menu key button. Buttons 183 and 184 provide scroll up and scroll down functionality. Buttons 185 and 186 provide selections for various items as discussed below. As stated above, for additional details of an exemplary gauge 107, see U.S. patent application Ser. No. 14/190,369, filed Feb. 26, 2014, entitled RECREATIONAL VEHICLE INTERACTIVE VEHICLE INFORMATION and U.S. patent application Ser. No. 14/770,424, filed Aug. 25, 2015, entitled RECREATIONAL VEHICLE INTERACTIVE TELEMETRY, MAPPING AND TRIP PLANNING SYSTEM, the entire disclosures of which are expressly incorporated by reference herein.

While vehicle 10 of FIG. 1 and vehicle 310 of FIG. 11 are described herein as including an engine 42 as the power source, vehicle 10, 310 may alternatively include an electric motor as the power source for powering the drivetrain. Vehicle 10, 310 may also comprise a hybrid vehicle having both an electric motor and an engine.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A recreational vehicle including:
   a chassis;
   a ground engaging member configured to support the chassis;
   a power source supported by the chassis, the power source including at least one of an engine and an electric motor;
   an ignition in communication with the power source and the ignition having an on-state and an off-state;
   a transmission driven by the power source;
   a sub-transmission coupled to the transmission, the sub-transmission having a plurality of selectable gear settings including a park gear setting and at least one of a forward gear setting, a reverse gear setting and a neutral gear setting;
   an actuator operative to change the gear setting of the sub-transmission;
   a shifter including a signal output operative to provide a shift request signal indicative of a request to change the gear setting of the sub-transmission;
   at least one sensor configured to detect at least one first speed value selected from a group of a ground speed of the vehicle and a speed of a component of the vehicle; and
   a controller including a processor, the controller being in communication with the actuator, the at least one sensor, and the shifter, wherein the controller controls the actuator to set the gear setting to the park gear setting in response to determining that all of a first set of park condition signals are satisfied, wherein the first set of park condition signals comprise: the ignition being in the off-state, the sub-transmission having a gear setting other than the park gear setting and the at least one sensor indicating that the first speed value is at or below a threshold.

2. The vehicle of claim 1, wherein the threshold is zero.

3. The vehicle of claim 1, wherein the speed of a component of the vehicle is a speed of at least one of the power source, the transmission, the ground engaging member, a flywheel of the power source, a drive shaft connecting the transmission to the ground engaging member, and a propeller shaft connecting the transmission to the ground engaging member.

4. The vehicle of claim 1, wherein the at least one sensor comprises two sensors and wherein a first sensor of the two sensors detects the first speed value and the second sensor of the two sensors performs a redundancy check of the first sensor.

5. The vehicle of claim 1, further comprising a shift sensor in communication with the sub-transmission, the shift sensor configured to verify the gear setting of the sub-transmission.

6. The vehicle of claim 1, wherein the controller controls the actuator to set the gear setting to the park gear setting in response to a second set of park condition signals, wherein the second set of park condition signals comprise: the ignition being in the off-state for at least a threshold amount of time and the sub-transmission having a gear setting other than the park gear setting.

7. The vehicle of claim 1, wherein the speed of a component of the vehicle comprises a speed of the power source and a speed of the ground engaging member and wherein the controller controls the actuator to set the gear setting to a target gear setting in response to a shift request for the target gear setting when the speed of the power source and the speed of the ground engaging member are within a first range and wherein the controller controls the actuator to cause the gear setting to remain in a current gear setting in response to a shift request for the requested gear setting when at least one of the speed of the power source and the speed of the ground engaging member are not within the first range.

8. The vehicle of claim 1, wherein the sub-transmission comprises a shift drum, a first shift sensor that detects at least one of a position of the shift drum and a position of the shifter and further wherein the controller is a proportional-integral-derivative controller that determines a position of the shift drum responsive to a signal received from the first shift sensor.

9. The vehicle of claim 8, further comprising a second sensor operable to perform a redundancy check on the first sensor.

10. The vehicle of claim 1, wherein the controller is placed in an off state in response to the ignition being in the off-state for at least a threshold amount of time.

11. A method of operating a recreational vehicle including:
    providing a controller for the recreational vehicle;
    receiving, at the controller, an indication of a vehicle ignition being in one of an on-state and an off-state;
    receiving, at the controller, an indication of a sub-transmission setting selected from the group including a park gear setting and at least one of a forward gear setting, a reverse gear setting and a neutral gear setting;
    receiving, at the controller, an indication of at least one first speed value selected from a group of a ground speed of the vehicle and a speed of a component of the vehicle; and
    emitting, by the controller, a signal to place the sub-transmission in a park setting when all of a first set of park conditions are satisfied, the first set of park conditions including:
    1) the ignition being in the off state,
    2) the sub-transmission having a gear setting other than the park gear setting; and
    3) the first speed value being at or below a threshold.

12. The method of claim 11, wherein the threshold is zero.

13. The method of claim 11, wherein the speed of a component of the vehicle is a speed of at least one of a power source, a transmission, a ground engaging member, a flywheel of the power source, a drive shaft connecting the transmission to the ground engaging member, and a propeller shaft connecting the transmission to the ground engaging member.

14. The method of claim 11, wherein receiving an indication of at least one first speed value selected includes receiving an indication from a first sensor that detects the first speed value and receiving an indication from a second sensor that performs a redundancy check of the first sensor.

15. The method of claim 11, further comprising receiving a signal from a shift sensor in communication with the sub-transmission, the shift sensor signal operable to verify the gear setting of the sub-transmission.

16. The method of claim 11, further including emitting a signal to control an actuator to set the gear setting to the park gear setting in response to a second set of park condition signals, wherein the second set of park condition signals comprise:
    1) the ignition being in the off-state for at least a threshold amount of time and
    2) the sub-transmission having a gear setting other than the park gear setting.

17. The method of claim 11, wherein the speed of a component of the vehicle comprises a speed of the power source and a speed of the ground engaging member and further including emitting a signal to control an actuator to set the gear setting to a requested gear setting in response to receiving a shift request for the requested gear setting when the speed of a power source and the speed of a ground engaging member are within a first range, and
    further including emitting a signal to control the actuator to cause the gear setting to remain in a current gear setting in response to receiving a shift request for the requested gear setting when at least one of the speed of the power source and the speed of the ground engaging member are not within the first range.

18. The method of claim 11, wherein the sub-transmission comprises a shift drum, and further including receiving a signal from a first shift sensor that detects at least one of a position of the shift drum and a position of the shifter, further including determining a position of the shift drum by a proportional-integral-derivative controller responsive to a signal received from the first shift sensor.

19. The method of claim 18, further comprising receiving a signal from a second sensor operable to perform a redundancy check on the first sensor.

20. The method of claim 11, further including initiating an off state of an engine control unit in response to the ignition being in the off-state for at least a threshold amount of time.

* * * * *